(12) United States Patent
Lindenmeier et al.

(10) Patent No.: US 7,702,051 B2
(45) Date of Patent: Apr. 20, 2010

(54) RECEPTION SYSTEM WITH PHASE ALIGNMENT OF ANTENNA SIGNALS

(76) Inventors: Stefan Lindenmeier, Eulenweg 9, Gauting-Buchendorf (DE) D-82131; Heinz Lindenmeier, Furstenrieder Strasse 7, Planegg (DE) D-82152

( * ) Notice: Subject to any disclaimer, the term of this patent is extended or adjusted under 35 U.S.C. 154(b) by 650 days.

(21) Appl. No.: 11/611,483

(22) Filed: Dec. 15, 2006

(65) Prior Publication Data

US 2007/0140389 A1  Jun. 21, 2007

(30) Foreign Application Priority Data

Dec. 15, 2005  (DE) ............... 10 2005 060 060
Dec. 6, 2006  (DE) ............... 10 2006 057 520

(51) Int. Cl.
*H04B 7/10*  (2006.01)
(52) U.S. Cl. ..................................... 375/347
(58) Field of Classification Search ............. 375/346, 375/347; 455/142, 575.1, 277.1
See application file for complete search history.

(56) References Cited

U.S. PATENT DOCUMENTS

| | | | |
|---|---|---|---|
| 4,079,318 A | | 3/1978 | Kinoshita |
| 5,517,686 A | | 5/1996 | Kennedy et al. |
| 6,049,705 A | * | 4/2000 | Xue ..................... 455/277.1 |
| 6,574,460 B1 | * | 6/2003 | Lindenmeier et al. .... 455/277.1 |
| 6,663,358 B2 | | 12/2003 | Loprete et al. |
| 6,768,457 B2 | * | 7/2004 | Lindenmeier ............... 342/374 |
| 6,917,794 B2 | * | 7/2005 | Marrah et al. ............ 455/276.1 |
| 6,925,293 B2 | * | 8/2005 | Lindenmeier et al. .... 455/276.1 |
| 7,127,218 B2 | * | 10/2006 | Lindenmeier ............... 455/101 |
| 2002/0196183 A1 | * | 12/2002 | Lindenmeier ............... 342/374 |
| 2004/0198274 A1 | * | 10/2004 | Lindenmeier ............... 455/130 |

FOREIGN PATENT DOCUMENTS

| DE | 43 26 843 | 2/1995 |
|---|---|---|
| DE | 102 06 385 | 9/2002 |

* cited by examiner

*Primary Examiner*—Chieh M Fan
*Assistant Examiner*—Jaison Joseph

(57) ABSTRACT

A reception system for frequency or phase-modulated high-frequency signals, for motor vehicles, having a multi-antenna system having at least two antennas, an individually adjustable phase rotation element, situated in the reception path of the corresponding antenna, in each instance, and a subsequent receiver circuit. There is an individually adjustable switching element for switching through or interrupting the signal flow, in the reception path of every antenna. The reception signals are guided by way of phase rotation elements and the adjustable switching elements which are passed to a linear combination circuit, and wherein the combined signal is passed to the receiver circuit. Furthermore, there can be a level indicator for indicating the level of the combined signal in the form of a level signal and a computer device to which this level signal and the phase alignment of the reception signals can be achieved.

27 Claims, 22 Drawing Sheets

FIG. 2A
FIG. 2B
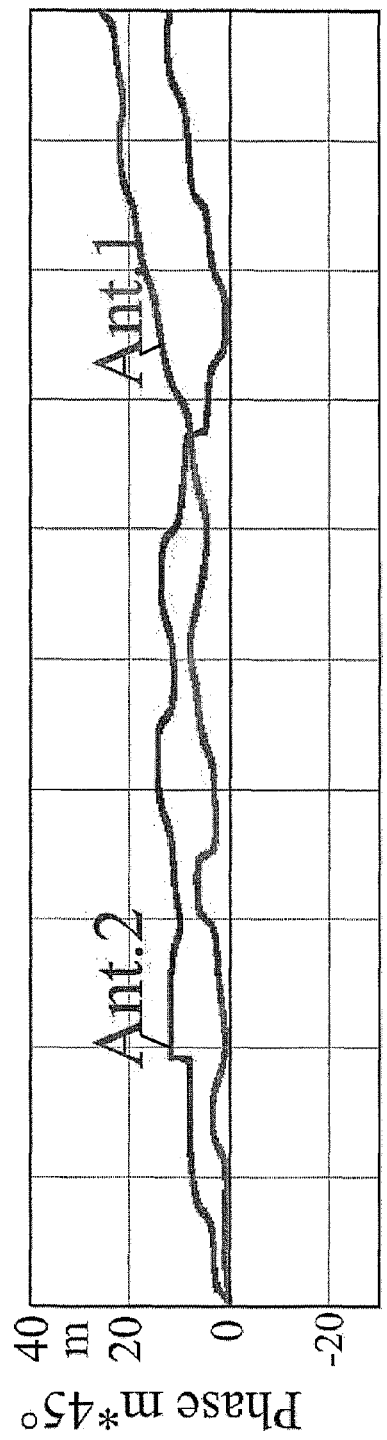
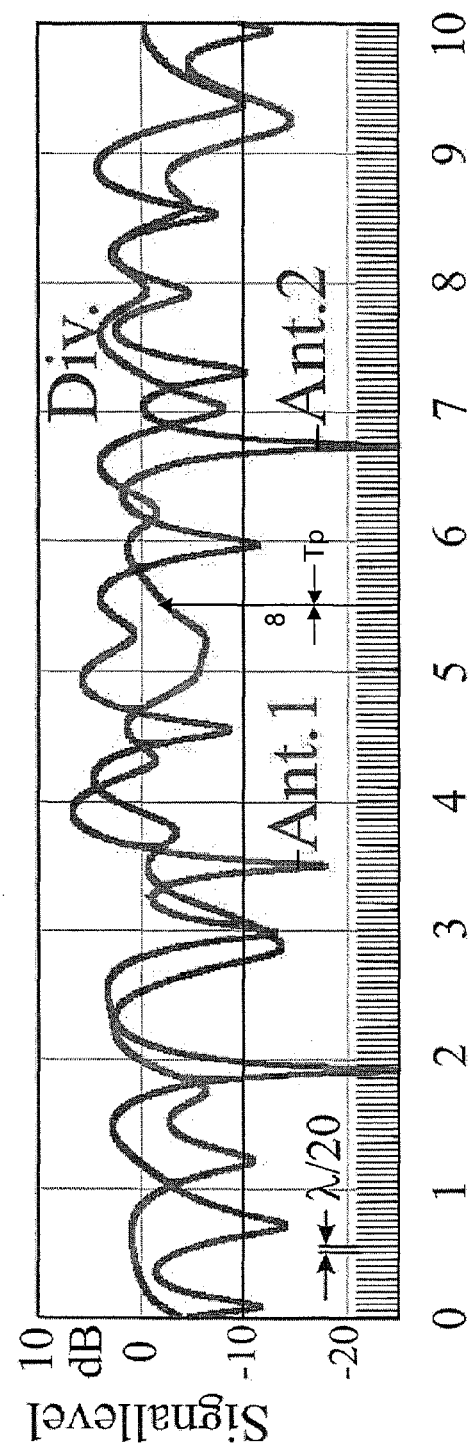

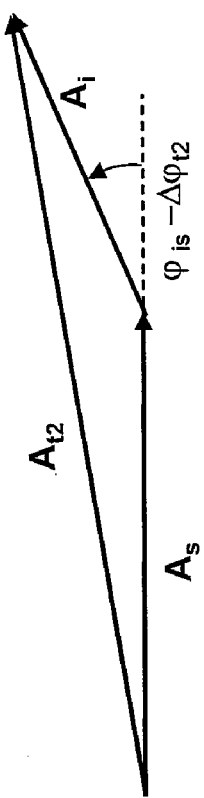
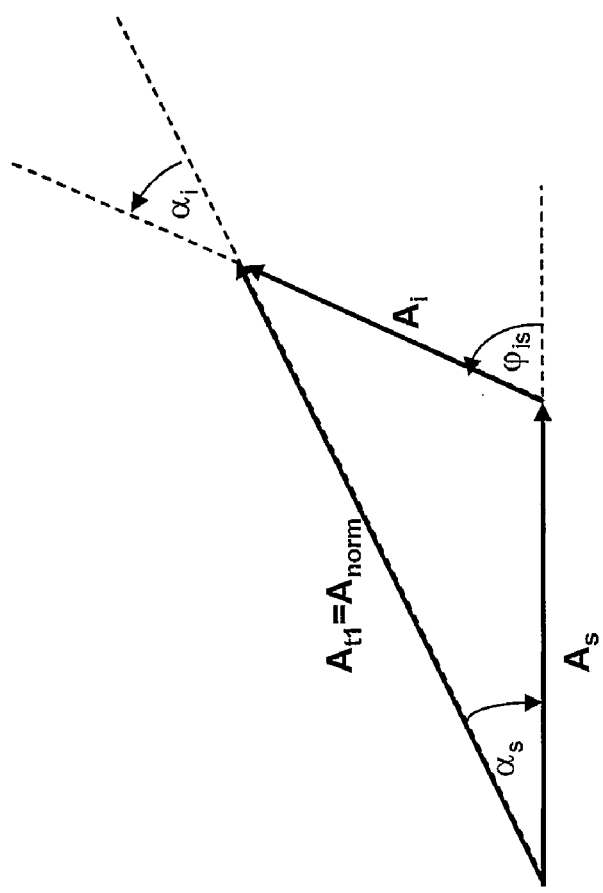
Fig. 11b
Fig. 11a (A_s is formed from the superimposition of all the antenna signals except for antenna signal i)

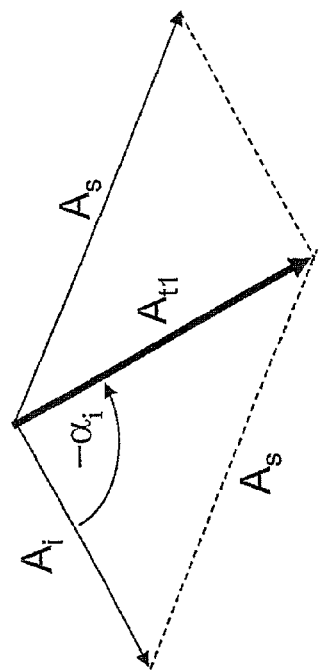
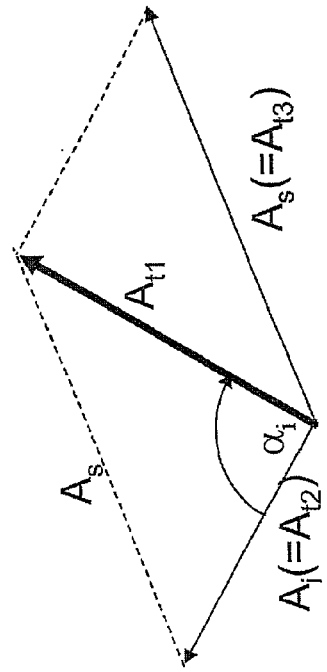
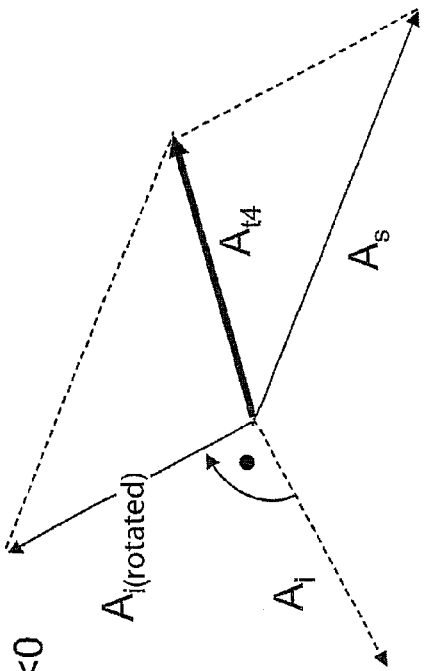
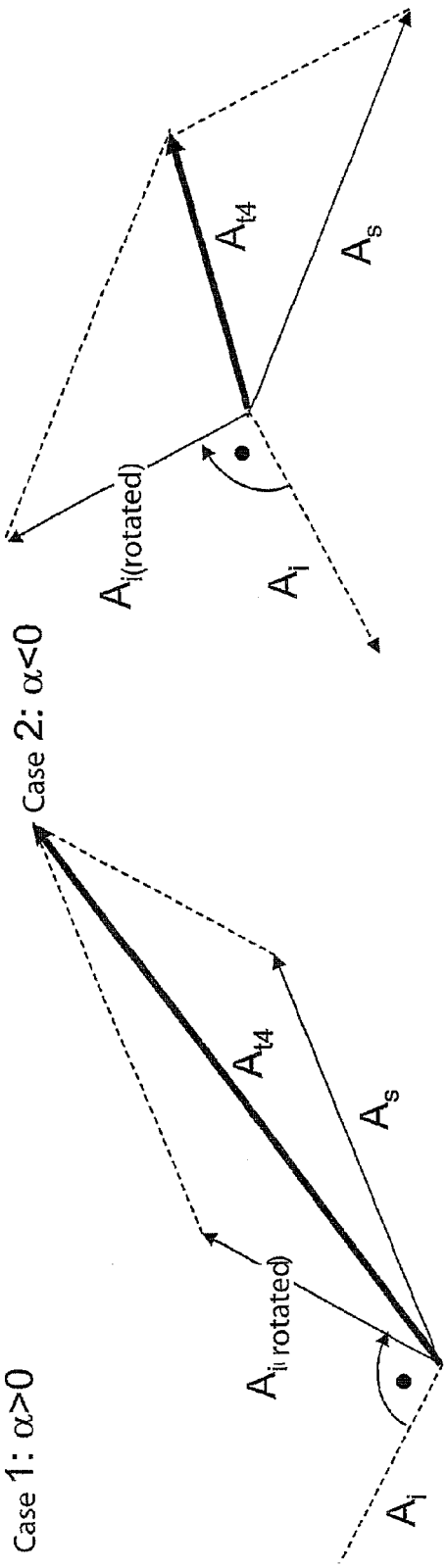
Fig. 20a
Fig. 20b

RECEPTION SYSTEM WITH PHASE ALIGNMENT OF ANTENNA SIGNALS

CROSS REFERENCE TO RELATED APPLICATIONS

This application hereby claims priority under 35 U.S.C. 119 from German Patent application DE 10 2005 060 060.3 filed on Dec. 15, 2006. This application also claims priority from 10 2006 057 520.2 filed on Dec. 6, 2006 wherein the disclosures of both of these applications are hereby incorporated herein by reference.

The invention relates to a reception system for high-frequency signals that are modulated in their frequency, i.e. modulated in their phase, for motor vehicles. There can be a device having a multi-antenna system 1 having a plurality of antennas Ant1, Ant2 . . . AN. There can be a switching device S1, S2, . . . S4 for the antenna selection, and an individually adjustable phase rotation element $\Phi 1, \Phi 2, \ldots \Phi N$, situated in the reception path of the corresponding antenna, in each instance, and a subsequent receiver circuit 2.

Antenna diversity systems of this type are preferably used for ultra-short-wave radio reception, and are known, for example from U.S. Pat. No. 5,517,686, U.S. Pat. No. 4,079,318, and DE 43 26 843 wherein the disclosures of these patents are incorporated herein by reference in their entirety. These diversity systems are designed to achieve a greater useful signal than with a single antenna, by means of same-phase superimposition of two or even more antenna signals. This superimposition is to thereby reduce the likelihood of level collapses in a territory with multi-path propagation. With this feature, a more advantageous average signal/noise ratio is achieved in the sum signal, with respect to the receiver noise.

U.S. Pat. No. 5,517,686, the disclosure of which is hereby incorporated herein by reference, relates to phase alignment of two antenna signals that is for example produced by using ancillary modulation. For this purpose, one of the two antenna signals is modulated in its amplitude. In U.S. Pat. No. 5,517,686, there is a controllable phase rotation element in the reception path of one of the two antennas. When the two signals are superimposed in the receiver, the frequency modulation in the sum signal produced by means of the ancillary modulation only disappears if the two reception signals possess the same phases. If the two phases of the superimposed antenna signals are not the same, then the sum signal is additionally frequency modulated with the tone of the ancillary modulation. Using a regulation device, the tone of the ancillary modulation is detected in the frequency demodulator, and the phase rotation element is adjusted by means of the regulation devices, so that the tone of the ancillary modulation in the sum signal disappears and thereby the two antenna signals are superimposed with the same phase.

However, this method has a significant disadvantage in that an additional signal in the form of an ancillary modulation has to be impressed on the signals to be received, to bring about phase alignment. For simpler implementation, the phase alignment frequently occurs in the intermediate frequency plane of the receiver. A disadvantage with this design is the increased technical effort and expenditure, which requires a separate antenna tuner for each antenna. With mobile reception in a vehicle, a problem of such systems is that when traveling through the Rayleigh reception field, the phase regulation circuit can no longer follow the resulting phase changes for same-phase superimposition of the signals in the summation element, and consequently, the signal of the ancillary modulation, as an undesirable signal in the sum signal, can bring about interference.

In particular, with systems that are sensitive with regard to faithful reproduction of the base band signals in the receiver, ancillary modulation can therefore not be used. This applies, in particular, to mobile systems having digitally modulated signals according to the MPSK method, such as for example modern radio satellite reception systems.

SUMMARY OF THE INVENTION

The invention can then relate to a diversity reception system for creating phase alignment without using ancillary modulation and with a plurality of antennas, while using a single receiver tuner.

This task is accomplished, by providing a reception system for motor vehicles, comprising a multi-antenna system having at least two antennas for producing reception signals. There can be at least one receiver circuit in communication with the antenna system, wherein this antenna system also includes at least one individually adjustable phase rotation element, wherein at least one phase rotation element is for receiving reception signals from a corresponding antenna. These phase rotation elements can have an output coupled to the receiver circuit.

There can be also individually adjustable switching elements for switching through or interrupting a signal flow, wherein each of the switching elements respectively, is present in a reception path of each antenna. These reception signals are then guided by way of the phase rotation elements.

After passing through the phase rotation elements and the switches, the reception signals can be combined in a linear combination circuit, and wherein this combined signal is passed to the receiver circuit.

The device can also include a level indicator for indicating the level of the combined signal in the form of a level signal. This level indicator can be in communication with the receiver circuit.

For controlling many of these elements, there can be a computer device having a memory and having an input coupled to an output of the level indicator. This computer device is for receiving the level signal. Stored on the memory is an algorithm wherein the algorithm performs calculations for determining a set of phase differences of the reception signals that are present at an input of the combination circuit at a given setting of the phase rotation elements from their level conditions. These calculations are used to determine phase differences wherein a determination is given on a basis of level measurement samples of the measurement signal. These calculations are performed one after the other in terms of time, and wherein the measurement samples are obtained by way of switch setting signals and phase setting signals brought about by the computer device wherein there are differently defined settings of the switching elements or of the phase rotation elements respectively.

The phase setting signals are generated on the basis of the phase differences determined by calculations, for the subsequent setting of the phase rotation elements. This is performed for phase alignment of the reception signals that are present at the input of the combination circuit. At this point, the plurality of adjustable switching elements are switched through.

The device can also optionally include a level test cycle generator that generates a level test cycle signal that is passed to the computer device for cyclical determination of the level measurement samples. These samples are determined at different settings of the switching elements or of the phase rotation elements respectively.

These level measurement samples can have a short level measurement duration (Tp) which is required for level indication, in each instance, wherein during a duration of each measurement sample, there is a determination of a setting of the switching elements or of the phase rotation elements, respectively, In this case, after an expiration of the level test cycle signal, there is an initiation of the phase setting signals for setting the phase rotation elements, for phase alignment of the reception signals located at an input of the linear combination circuit.

The memory of the computer device can include a program having a computer code which performs a number of different functions. For example, one function can include updating a phase alignment of the reception signals located at an input of the linear combination circuit by means of a repeated occurrence of level test cycle signals at level test cycle time intervals. These time intervals (Tz) are adapted to a time change in the reception conditions, so that the phase changes in the reception signals caused by a change over time of the radio transmission channel during the test cycle time interval (Tz) are small enough to be ignored, with regard to reception interference.

These time intervals (Tz) between the level test cycle signals can be selected to be sufficiently short such that a driving distance traveled during this time interval (Tz) is not more than 1/5 of a length of a high-frequency carrier wave.

In one design the reception system can be for digitally modulated high-frequency signals according to the MPSK method, wherein the program code includes an additional set of functions comprising updating of a phase alignment which is given independent of a symbol cycle and frame signals of the MPSK modulation.

The program can also perform other optional functions. For example, the program can perform calculations on the level test cycle signal for determining phase differences of the reception signals (E1, E2). Other functions can include obtaining three level measurement samples. This process can include obtaining two level measurement samples with alternative closing of two switching elements of a first and a second antenna. The process can also include obtaining a third measurement sample with a simultaneous closing of the switching elements of the first and second antenna with all other switching elements being switched open.

Another step can include determining phase differences between related reception signals located at an input of the combination circuit and then creating a phase alignment of the two reception signals of the first and second antenna which is created by means of at least one phase rotation element. With this process, for successive phase adaptation of the reception signal of at least one additional antenna, a first and a second switching element are switched in a same direction while maintaining a setting of the phase rotation elements. The first and the second antenna signals are combined so that they enter into a place of the first antenna, with regard to a sequence of phase alignment;

The additional switching element of the additional antenna is set in accordance with the second antenna to determine corresponding level measurement samples. In this case, the setting of the additional phase rotation element of the additional antenna can be on a basis of a determined phase difference. In this case, the phase rotation element of each antenna is continuously set until phase alignment is produced for all reception signals.

The device can further comprise a plurality of HF-IF parts wherein for several different frequency bands (a, b, c), the HF-IF parts are each tuned to a corresponding frequency band, so that each of the switching elements is followed by at least one phase rotation element. These phase rotation elements respectively correspond to each of the frequency bands, whereby a set of reception signals are respectively assigned to these frequency bands in each instance. These reception signals are combined into a combined signal in an assigned linear combination circuit, in each instance, and passed to a corresponding one of the plurality of HF-IF parts.

The phase alignment of the reception signals are respectively superimposed in the combination circuits and are updated for all the frequency bands at level test cycle time intervals (Tz).

In one embodiment, the receiver circuit has an input for reception of a radio channel, wherein the system can be formed as a separate diversity unit, and also include a receiver line for connecting the diversity unit to the receiver circuit.

The diversity unit is connected with the antennas on an input side, and with the receiver circuit on the output side, by way of the receiver line.

The diversity unit can house the level indicator, the computer device, the switching elements, the phase rotation elements, the combination circuit, and an HF-IF part.

With this design, a combined signal is passed on the input side, and the output signal is passed on to the level indicator. The combined signal is passed on to the receiver circuit by way of the receiver line.

The receiver circuit can have at least one input for receiving at least one signal from at least two channels that differ in frequency. With this embodiment, the device can also include a diversity unit that has a plurality of HF-IF parts. This diversity unit has an input for receiving signals from at least two antennas and an output coupled to the receiver line which is coupled to the input side of the receiver circuit.

This diversity unit can also include a signal level indicator wherein the signal level indicator is coupled to the plurality of HF-IF parts. Wherein each of the plurality of HF-IF parts have an input for receiving at least part of the combined signal.

In another embodiment, there can be a diversity unit wherein the level indicator, the computer device, the switching elements, the phase rotation elements, and the combination circuit, are disposed in the diversity unit. The diversity unit further comprises a multi-channel frequency converter which is used for joint frequency conversion of different high frequency satellite signals into frequencies that are different from one another in a lower frequency plane.

This embodiment can also include plurality of band pass filters for receiving the frequency plane, wherein the band pass filters are for separating the signals that are different in frequency. The separate level indicator determines a level of the signals that are determined separately, wherein these signals are passed to the computer device.

In another embodiment there can be a diversity unit wherein the level indicator, the computer device, the switching elements, the phase rotation elements and the combination circuit, are disposed in the diversity unit.

This diversity unit can also comprise a controllable mono-channel frequency converter that is used for alternate setting to the frequency of the high-frequency satellite reception signal so that a signal in a lower frequency plane occurs at its output. The diversity unit can also include a band pass filter wherein the signal from the frequency converter is passed to the signal level indicator by way of the band pass filter. With this design, the computer device generates channel selection signals which determine both the cycle in accordance with a level test cycle time interval (Tz) and a selection of the signal to be tested for two satellite channels.

In another embodiment there can be a reception system wherein there can be a plurality of HF-IF parts which produce output signals located in a low frequency plane. There can also be a cycled level test change over switch wherein the output signals of the plurality of HF-IF parts are passed to the change over switch. There can also be a signal level indicator for receiving signals from the change over switch. This device can also include a microprocessor for receiving level signals from the signal level indicator. In this case, the signal level indicator is controlled by the microprocessor. This device can also include plurality of frequency setting switches wherein the reception system comprises a diversity unit which comprises individually adjustable phase rotation elements, individually adjustable switching elements, at least one frequency setting switch. There can also be a logic circuit for receiving signals from the frequency setting switches in the diversity unit which receives digital signals from the frequency setting switches in the receiver. The logic circuit generates the phase setting signals for setting the plurality of individually adjustable phase rotation elements and the switch setting signals.

The computer device can have an algorithm stored therein which performs a series of calculations. The calculations can be used to determine a phase difference ($\alpha_i$) between a phase ($\Phi_{norm}$) of a combined signal ($E_{norm}$) that is present at an output of the linear combination circuit before occurrence of the level test cycle signal. There can be a set of phases of the reception signals of the antennas, wherein the phases of the reception signals are rotated into a phase position ($\Phi_{norm}$) of the combined signal ($E_{norm}$) that is present at the output of the linear combination circuit. This is before occurrence of the level test cycle signal in each instance on the basis of the phase differences ($\alpha_i$) by means of setting the phase rotation elements.

In one embodiment, the computer device can have a program stored in a memory wherein the program has a set of instructions to perform a series of calculations. The calculations and steps can include avoiding ambiguities with regard to phase differences ($\alpha_i$) to be determined, within a framework of a level test cycle. This can occur by changing a phase ($\Phi i$) of at least one of the reception signals by a predetermined phase change value. These phase differences that actually apply are determined from a set of level measurement samples (8).

In one embodiment the phase rotation element ($\Phi 1$) has a phase rotation angle that has a fixed set, discrete value. For example, there can be a plurality of phase rotation elements ($\Phi 1$) which each have phase rotation angles that have a fixed set of discrete values so that all phase angles of an angle space of 360 can be set in a discrete manner with a predetermined step width of 360 /(M*A). In this case, M is a modulation number while an angle resolution A is selected to be sufficiently large to avoid detection errors of the symbols. In this embodiment, phase rotation elements select an angle resolution that is not smaller than A=1.

In one embodiment there can be reception system that is formed as a MPSK system wherein the phase rotation elements set an angle based upon 360 /(M*A), with a resolution A of at least A=2.

In this case there can be at least four antennas, and wherein the system can further comprise at least two node points, wherein there can be a plurality of switching elements that comprise a first switching element that alternately switches between at least two of the antenna signals from at least two antennas to a first node point as a pair for performing a level test. There can also be an additional switching element that switches between at least two additional antenna signals from at least two other antennas to a second node point. An output of the first switching element and the additional switching element are each passed to at least one phase rotation element, wherein each output signal of the two node points is passed to the linear combination circuit. This occurs so that each output signal of the node points are superimposed with a same phase in a combined signal. With each antenna pair, there can be a signal wherein the greatest level is switched through.

In another embodiment, there can be least three antennas including a first antenna, a second antenna and a third antenna; wherein the switching elements comprise at least two switching elements including a first switching element, and a second switching element.

There can be a plurality of phase rotation elements such as at least two phase rotation elements including at least a first phase rotation element and at least a second phase rotation element. The system can further comprises at least two nodes including at least a first node and at least a second node wherein, at least two of the three antennas are switched to the first node of to form a first antenna signal. There can be a third antenna that is switched to the second node to form a second antenna signal. In this case, an output of the first node is in the form of a first antenna signal which is communication with the first phase rotation element. In addition, an output of the second node which is in the form of a second antenna signal that is in communication with the second phase rotation element. In this case, the first phase rotation element and the second phase rotation element are coupled together such that the first antenna signal and the second antenna signal form a combined signal. In this case, the combined signal is formed from a same phase superimposition of the first antenna signal and the second antenna signal having a greatest level.

In another embodiment there can be a reception system having two channels, wherein with this embodiment there can be a plurality of HF filters, with at least one HF filter disposed along each channel.

There can also be a channel selection switch wherein the HF filters have their output passed to the channel selection switch at whose output the signal of the frequency channel in question is passed to the signal level indicator, in each instance, and the channel selection switch is appropriately controlled by the channel selection signals generated in the computer device.

In another embodiment, there can be a computer device which includes an A-D converter for digital signal processing and level assessment disposed on an input side of the computer device.

In one embodiment, the computer device has a program that performs different functions including determining different levels of signals in terms of amount and sign at four different test settings. Another step can include determining a level of an antenna signal, in a test setting. This process can include determining a level of an antenna signal in a test setting, and then determining a level of a sum signal of signals and in a test setting. Another step can include determining an amount of an angle from three level values for the differentiation of two possible signs of angle. Another step can include forming a sum signal in a further test setting from a signal rotated by a positive angle. Another step can include measuring a level of the sum signal while another step can include determining a true sign of an angle via calculations from a geometric relationship.

In another embodiment there can be a reception system wherein the computer device has a program that performs a plurality of different functions. These functions or steps can include determining a difference of a phase angle of an antenna signal. This difference is determined between values measured in consecutive time intervals Tz, wherein if an angle difference that is required for plausibility is exceeded, the plausible value is determined by means of repeated determinations of a phase angle. Another step can include selecting time intervals Tz in a manner so that a travel path traveled during the time interval Tz is not greater than $\frac{1}{20}$ of a length λ of a high-frequency carrier wave.

Other optional steps can include measuring a level of a combined signal to determine a need for a phase alignment of antenna signals. In this case, the combined signal is measured in consecutive time intervals Tz. Another step can include determining whether a minimal level of the combined signal has been reached. Another step can include performing a cycle for phase alignment of the minimal level if the combined signal is not reached. In this case, if a minimal level of the combined signal has been reached, a current setting of the phase rotation elements remains unchanged.

These functions can be performed to determine the phase rotation angle between the sum signal of the antenna signals that have already been superimposed in a same phase before a beginning of a test cycle. In this case, an antenna signal is supposed to be phase aligned with the sum signal.

The following advantages, among others, are achieved using the reception system according to the invention:

Only one tuner in the receiver is required for the diversity function, for every radio channel. The method based on this design is particularly efficient.

Data losses are prevented by phase regulation. These data losses can occur due to changes of the phase settings at the individual antennas, particularly in BPSK, QPSK, MPSK, and FM systems and other transmission systems with signal transmission by way of frequency or phase evaluation.

Transmission of signals with a reference phase is not necessary for the proposed diversity method.

In the case of digital modulation, such as, for example, according to the BPSK, QPSK, MPSK method, synchronization of the control of the procedure for phase alignment with the data structure is not necessary. Instead, it is sufficient to derive current level data from the receiver, or to generate the level data close to the antennas, from the antenna signals. Making the symbol cycle available, or making the data frame signal available from the base band signal processor, something that is often complicated, can be eliminated with the design of the present invention. Thus, there is no development effort for making available receivers that can be equipped with a unique diversity circuit having phase modulation. Therefore, it is not necessary to send a cycle signal from the receiver to the diversity circuit, or vice versa; the diversity circuit can be implemented with little hardware expenditure; and the control algorithm can be kept feed-back-free.

With multiple radio channels, the reception level can be maximized separately for every radio channel, by means of correct-phase superimposition of the antenna signals.

Diversity reception systems for a satellite reception system are known from DE 10206385. There, switching of the antennas is synchronized with the cycle of the data signals, thereby achieving updating of the reference phase at all times. With a reception system which relates to the present invention, these cycle signals are not necessary for controlling the diversity process, something that is advantageous for efficiency.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 2A is a view of two graphs showing the progression of phases of the reception signals of two antennas mounted on a vehicle as a function of the path distance traveled in a reception field;

FIG. 2B is a progression of amplitudes of reception signals of antennas vs. wavelength of the signals;

FIG. 11A is a vector diagram of a first test position;

FIG. 11B is a vector diagram of a second test position;

FIG. 20A is a vector diagram of different antenna signals wherein this diagram is for determining phase alignment from amplitudes of the antenna signals; and FIG. 20B is a vector diagram of different antenna signals wherein there is a rotation of phase of a signal by 90 degrees and a formation of a sum from this signal which makes it possible to determine the sign of the angle from the resulting amplitude of the sum signal.

DETAILED DESCRIPTION

Figure 1:
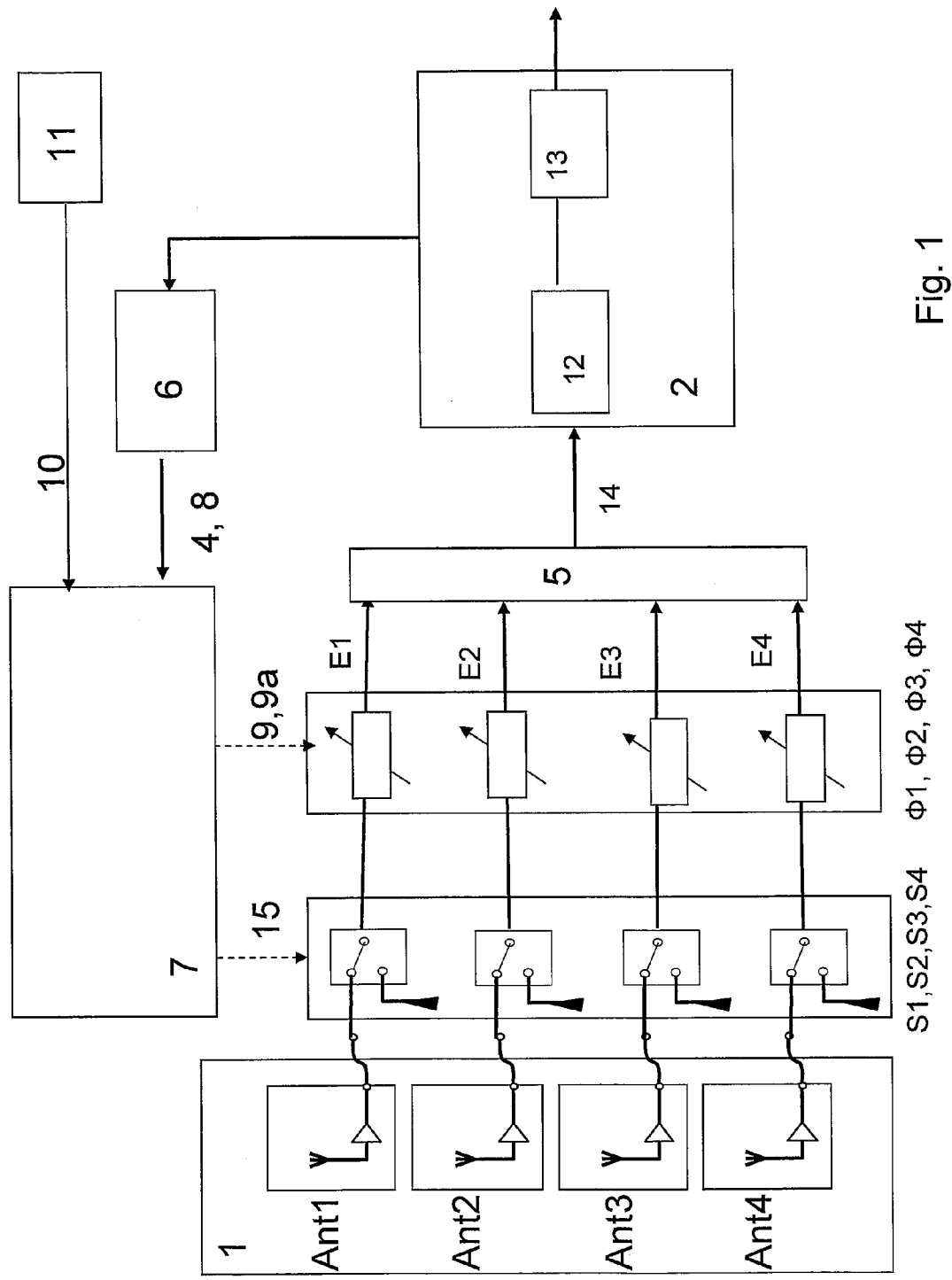
FIG. 1 is a schematic block diagram of a first embodiment of a reception system having a multi-antenna system.

FIG. 1 shows the reception system according to the invention with a multi-antenna system having antennas Ant1, Ant2, Ant3, Ant4. There are also a plurality of individually adjustable switching elements S1, S2, S3, S4, which can each be connected to associated individually adjustable phase rotation elements $\Phi 1$, $\Phi 2$, $\Phi 3$, $\Phi 4$ . . . $\Phi n$. There is also a summation or combination circuit 5 for receiving the signals E1, E2, E3, E4, from each of the phase rotation elements. The summation or combination circuit 5 is for combining the reception signals E1, E2, E3, and E4 which are superimposed with the same phase in the summed or combined signal 14. There is a reception circuit 2 which has an input for receiving the combined signal 14. There are also HF-IF parts 12 and 13 disposed inside of the reception circuit 2. The output of this reception circuit 2 feeds into a signal level indicator 6 for displaying the level of the reception signal 14. The output of the level indicator 6 feeds into an input of a computer unit 7. In addition, there a level test cycle generator 11 for generating a level test cycle signal 10, wherein this signal 10 is sent into computer unit 7. Computer unit 7 generates phase setting signals 9, 9a for sending these signals to the phase rotation elements $\Phi 1$, $\Phi 2$, $\Phi 3$, $\Phi 4$. Computer 7 can also send switch setting signals 15 to switches S1, S2, S3, and S4, to control these switches.

The fundamental idea of at least one embodiment is the determination, by calculations, of phase differences between current complex amplitudes of the high-frequency carriers of the different reception signals E1, E2 . . . of the antennas A1, . . . A4. This presupposes that the radio transmission channel changes sufficiently slightly, during the process of phase alignment, so that the amplitudes of the high-frequency carriers in the transmission signals are sufficiently constant during the balancing of the phase alignment. Therefore, with at least one embodiment, those modulation methods, are eliminated. These modulation methods would occur in which rapid amplitude changes occur due to the modulation, so that the amplitude of the transmitted high-frequency carrier does not remain sufficiently constant during balancing of the phase alignment. After the phase differences have become known, phase rotation elements $\Phi 1$, $\Phi 2$ . . . are set in such a manner that the corresponding signals are superimposed with the same phase.

The reception signals can in each instance be passed to a summation or combination circuit 5 for summation of the reception signals E1, E2 . . . by way of switching elements S1, S2 . . . and by way of corresponding phase rotation elements $\Phi 1$, $\Phi 2$ . . . The switching elements S1, S2 . . . are configured so that they switch the corresponding signal through either to the corresponding phase rotation elements $\Phi 1$, $\Phi 2$ . . . or switch it away completely, in each instance. The fundamental idea of at least one embodiment consists in determining a phase difference between different high-frequency signals by means of calculations, merely from their amplitude amounts and the subsequent phase alignment and positive superimposition of the antenna signals. In a simple basic form of the algorithm that is applied, the related momentary amplitudes A1 and A2 of the reception signals E1, E2 are determined, one after the other. This determination occurs by means of short level measurement samples 8 with the level indicator 6, for phase alignment of two reception signals E1, E2. In this process, only the corresponding switching element S1 or S2, respectively, is switched for passage. All of the other switching elements are open. The measured reception levels are first stored in the memory of the computer device 7. Subsequently, the combined signal 14 is detected at the output of the combination circuit 5, as a superimposition of the two reception signals E1, E2, by means of another short level measurement sample 8, and also stored in the memory of the computer device 7. The phase difference between the two reception signals is determined by means of calculations, except for the sign, from the three measured values, as will be described below. The reception signals E1 and E2 are then superimposed with the same phase in the combination circuit 5, by means of setting the phase rotation elements $\Phi 1$ and $\Phi 2$ by means of a phase setting signal 9a generated in the computer device 7. This superimposition also occurs with setting of the switching elements S1 and S2 to passage by means of corresponding switch setting signals 15, if the correct sign of the phase difference was selected. A counter-sample with the opposite sign of the phase difference and a comparison of the amplitudes determined in the combined signal 14 in this connection results in correct setting of the phase rotation elements for same-phase superimposition of the reception signals E1 and E2, so that the maximal amplitude of the superimposition of the two reception signals E1 and E2 is passed to the receiver circuit 2 after the expiration of the phase alignment process. Phase alignment of the other reception signal E3 can take place in analogous manner, in that first, the level of the combined signal is determined and stored in the memory of the computer device 7. The amplitude A3 is first determined using a short level measurement sample 8, by means of opening the switching elements S1 and S2 and by means of closing the switching element S3, and stored in the memory of the computer device 7, in order to subsequently determine the level of the new combined signal 14 that occurs in this connection, when the switching elements S1 and S2 and S3 are closed. Phase alignment of the reception signal E3 with the two reception signals E1 and E2 that have already been phase-aligned is then brought about using the levels of the preceding combined signal 14, the reception signal E3, as well as the new combined signal 14, in analogous manner. This method can be used analogously for phase alignment of any desired number N of additional reception signals EN of N antennas AntN.

It is known that the data stream of every digital signal transmission also contains signals designated as "burst signals" or as "fame data" for synchronization of the transmission. These signals are established in accordance with the corresponding standard and are transmitted repeatedly at the time interval of the frame period TR. The burst signal contains symbols that contain the reference phase for receiver-side phase synchronization of the system. To ensure reliable synchronization to the symbol cycle even at high speeds, both the frame frequency and the time duration TB of the burst signal are selected to be suitably large. The receiver-side detection of the carrier phases contained in the useful symbols transmitted, can only occur in an assured manner if the signal/interference ratio is sufficiently large and the system is synchronized to the symbol cycle by means of the burst signals and the reference phase is set. However, a fundamental problem results from the situation that both the amplitude and the carrier phase of the reception signal vary greatly over the travel distance in a reception field that is subject to interference due to multi-path propagation. These variations lead to incorrect detection of the symbols if, for example, the error phase deviation is not less than ±π/4 in the case of a 4PSK system. FIG. 2a shows the phase progression of the reception signals in multiples of π/4 of two antennas Ant1 and Ant2 plotted above the path distance in (λ/20)-steps. For example, FIG. 2A shows the progression of the phases of the reception signals in 45 degree steps, of two antennas Ant1 and Ant2 mounted on a vehicle, as a function of the path distance traveled in the multi-path propagation reception field, with reference to the wavelength λ.

As a comparison for this, the related level progressions are shown in FIG. 2B. FIG. 2B shows the progression of the amplitudes of the reception signals of the antennas Ant1 and Ant2 in FIG. 2A), as well as the progression of the greater of these signals at each point in time (Div), selected according to a simple level criterion to illustrate the level variations over short travel distances. The raster of 1/20 as indicated shows the constancy of the level conditions over the short path distances that lie between the raster markings.

If permanent symbols having a phase that remains the same—for example in the phase state π/4—are transmitted, lined up with one another, then there is a high-frequency carrier on the receiver side, in each instance. The stochastic phase and amplitude progression are shown as examples in the polar diagrams in FIG. 3A and 3B, respectively, when using one of the two antennas Ant1 and Ant2, in each instance, in the moving vehicle. For example, FIG. 3A shows a representation of the progression of the complex amplitude of the reception signal E1 of the antenna Ant1 in FIG. 2B in the complex plane, as a function of the path distance traveled in the Rayleigh reception field, with transmitter-side transmission of a high-frequency carrier having a constant phase.

Figure 3B:
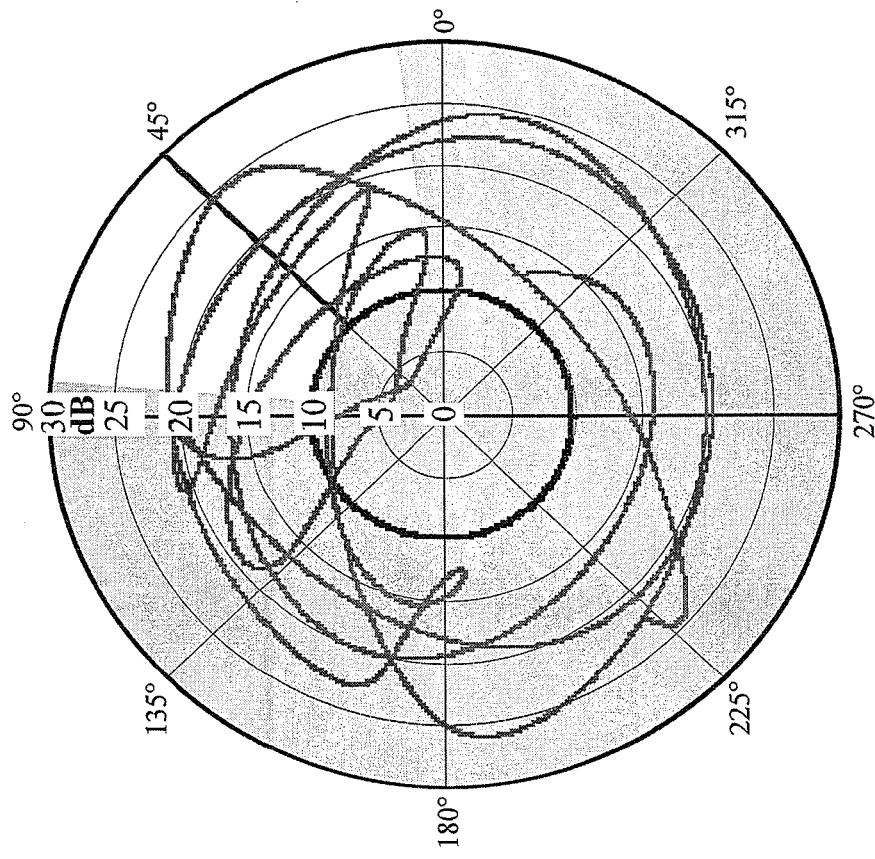
FIG. 3B is a corresponding progression of complex amplitude of a second reception signal of a second antenna shown in FIG. 2A.
Figure 3A:
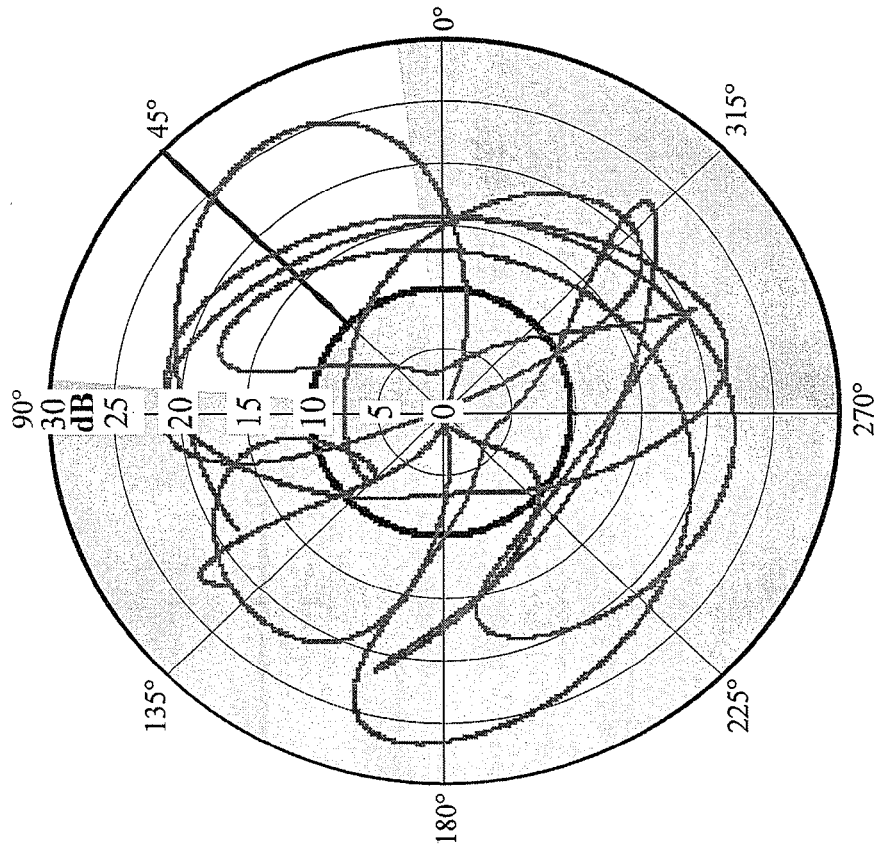
FIG. 3A is a representation of a progression of a complex amplitude of a reception signal of an antenna in FIG. 2A.

This shows that the two phase and amplitude progressions of the reception signal E1 shown in FIG. 3a and E2 shown in FIG. 3b, respectively, are stochastically completely different from one another, as a function of the path distance traveled in the Rayleigh reception field, in the moving vehicle. For example, FIG. 3A is a representation of the progression of the complex amplitude of the reception signal E1 of the antenna Ant1 in FIG. 2a in the complex plane, as a function of the path distance traveled in the Rayleigh reception field, with transmitter-side transmission of a high-frequency carrier having a constant phase. FIG. 3B is a corresponding progression of the complex amplitude of the reception signal E2 of the antenna Ant2 on the same vehicle as in a) in accordance with FIG. 2A.

When there is reception in only one of the two antennas, in each instance, the receiver is informed of the reference phase for correct detection of the subsequent symbols with the burst signals in time intervals TR. However, a system of this type, which must depend on only one antenna signal, is subject to interference and loses the correct reference phase when traveling through a territory with level fading in the Rayleigh reception field. This occurs until it again receives a burst signal with reference phase that is not subject to level fading. It is a particular disadvantage that in the case of an overly high bit error rate that results from this, the redundancy of the system is often not sufficient, the system desynchronizes, and an extended resynchronization process with data loss takes place in the receiver, even if the level fading eases up. To avoid such situations, it is therefore decisive to avoid the level fading in the reception signal that comes up for detection in the receiver.

Several reception signals E1, E2 ... EN that are different in terms of diversity can therefore be superimposed, so that there is a corresponding likelihood that the combined signal is not subject to the level fading. With this feature, the superimposition occurs via a summation of the reception signals that are set to be of the same phase. This creates the advantage of the maximal possible signal/noise distance in the receiver. The level test duration Tp for determining a level measurement sample 8 can generally be less than what corresponds to the reciprocal value of the channel band width B of the system. The following example is performed, at a band width B=4 MHz and a level test cycle time interval Tz=250 µs and for a frequency of 2.3 GHz and a maximally assumed driving speed of 100 km/h. This example shows that while it is true that some symbols are transmitted with interference, because of the processes of level testing, the loss of symbols stands in a ratio that is small enough to be ignored, as compared with the number of symbols that are not recognized correctly due to level fading in difficult reception regions. This is clearly evident from FIG. 2b, if one assumes that all of the symbols are lost over those driving distances within which the amplitude of the reception signals that come up for detection is lower than the minimally required value for correct symbol recognition. For example, the phase error brought about by the Rayleigh reception field is so significant that correct symbol recognition is no longer possible in the receiver.

The differences in the reception signals with regard to amplitude and phase are shown in FIGS. 3a and 3b for the two antennas in FIG. 2A, for the case that permanent symbols with the phase remaining the same—for example in the phase state π/4—are transmitted, lined up with one another. In this case, the stochastic phase and amplitude progressions of the reception signal E1 in FIG. 3a and E2 in FIG. 3b, respectively, are obtained on the receiver side as a function of the path distance traveled in the Rayleigh reception field in the moving vehicle, with phase alignment of the two antenna signals. According to the invention, therefore, the reception signals E1, E2 ... EN are updated at sufficiently small test cycle time intervals $T_z$, following one another, with regard to their phase alignment, and superimposed with the same phase in the combination circuit 5, in order to avoid level collapses in the combined signal. The test cycle time interval $T_z$ must be selected in such a manner, according to the invention, that the phase alignment can be viewed as technically existing during the movement of the vehicle. The receiver circuit 2 then receives the reference phase again—similar to operation with only one antenna—by means of the burst signals that are, with great likelihood, reliably detected in the receiver circuit 2, due to the maximized combined signal 14 according to the invention.

Figure 4:
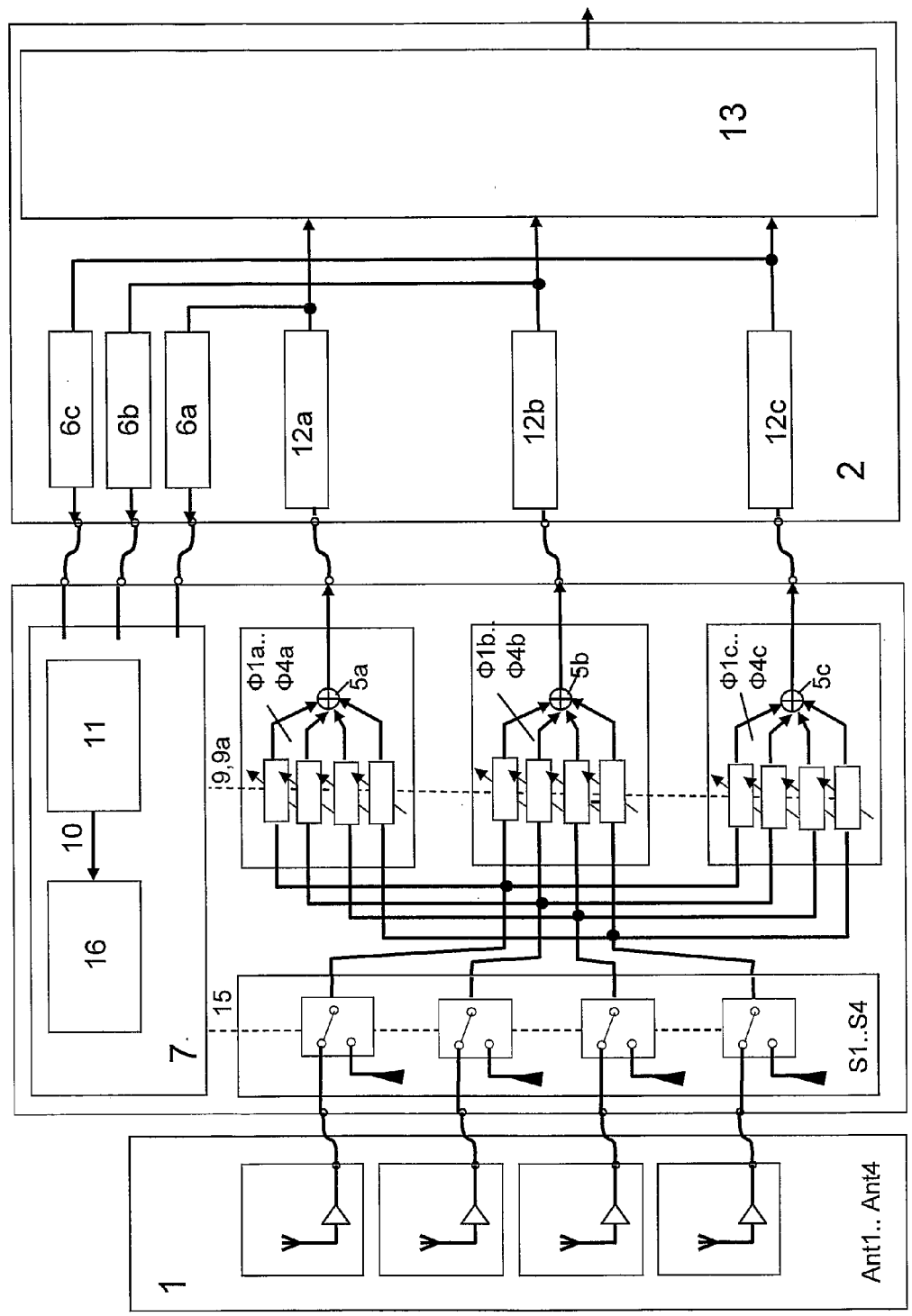
FIG. 4 is a schematic block diagram of another embodiment of a reception system.

FIG. 4 shows a schematic block diagram similar to the reception system in FIG. 1. This design differs in that it is supplemented with an additional two branches. The components of the different branches, which correspond to one another, are indicated as a, b, c. With this design, the multi-antenna system 1 and the switching elements S1, S2 ... are used for same-phase reception of several different frequency bands a, b, c, which are received with several HF-IF parts 12a, 12b, 12c. These HF-IF parts are tuned to these frequency bands a, b, c, as shown in FIG. 4. For this purpose, the output signals of the switching elements S1, S2 . . . S4 are passed to a plurality of phase rotation elements Φ1*a*, Φ2*a*, Φ3*a*, Φ4*a*, or Φ1*b*, Φ2*b*, Φ3*b*, Φ4*b*, or Φ1*c*, Φ2*c*, Φ3*c*, Φ4*c*, respectively, corresponding to the frequency bands, whereby their reception signals E1*a*, E2*a*, E3*a*, E4*a*, or E1*b*, E2*b*, E3*b*, E4*b*, or E1*c*, E2*c*, E3*c*, E4*c*, respectively, assigned to the frequency bands a, b, c, in each instance, are combined into a combined signal 14*a*, 14*b*, 14*c* in the assigned combination circuit 5*a*, 5*b*, 5*c*, in each instance, and passed to the corresponding HF-IF part 12*a*, 12*b*, 12*c*. The phase alignment of the reception signals (E1*a*, E2*a*, E3*a*, E4*a*, or E1*b*, E2*b*, E3*b*, E4*b*, or E1*c*, E2*c*, E3*c*, E4*c*, respectively) superimposed in the combination circuits (5*a*, 5*b*, 5*c*) is updated for all the frequency bands a, b, c, at level test cycle time intervals (Tz).

The different branches in FIG. 4 allow, for example, coordinated reception of three satellite radio signals digitally modulated according to the QSPK method. These signals are transmitted at the same time, and have the same signal content, in adjacent high-frequency bands of the same HF channel band width B, but offset by running time, in each instance, to for example, support the transmission reliability of different satellites. All of the received signals are coordinated and evaluated in the receiver 13, so that the best possible security of data transmission is obtained by means of the antenna diversity function in connection with the three satellite transmission paths or also two satellite transmission paths and one terrestrial transmission path.

Figure 5A:
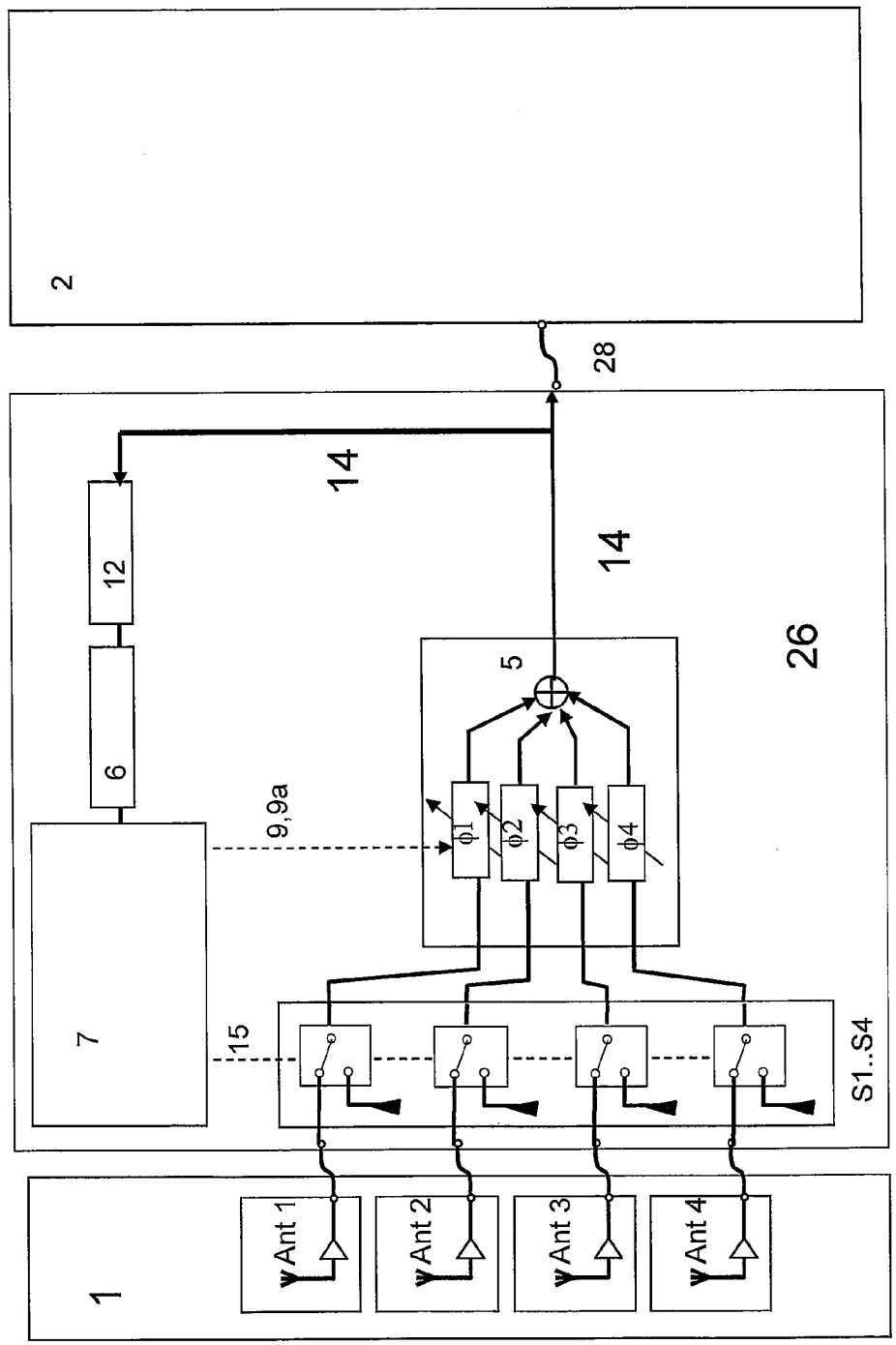
FIG. 5A is a schematic block diagram of a reception system similar to that of FIG. 1 however this embodiment discloses some of the components disposed in a diversity system.

Another embodiment is shown in FIG. 5A. In this embodiment, there is a reception system similar to that shown in FIG. 1, but with a receiver circuit 2 formed by a receiver produced in standard manner, and a diversity unit 26 separate from the receiver circuit 2. This diversity unit 26 has a separate HF-IF part 12 situated in the unit, for the radio signal to be received. This diversity unit has a level indicator 6, a computer device 7, as well as the switching elements S1, S2, . . . and the phase rotation elements Φ1, Φ2, . . . and combination circuit 5.

Figure 5B:
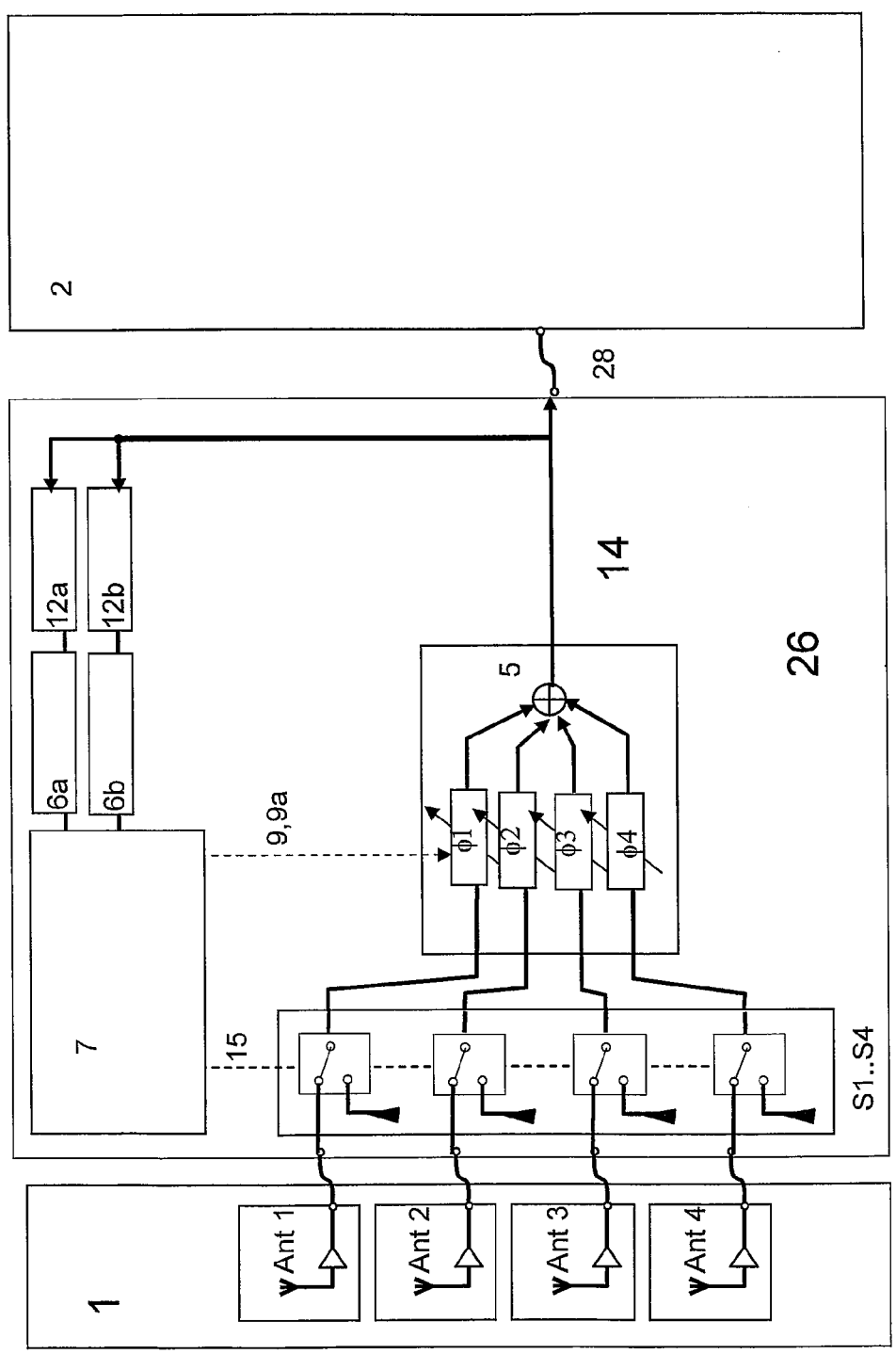
FIG. 5B is a schematic block diagram of a reception system similar to that of FIG. 4 wherein this embodiment discloses some of the components disposed in a diversity system.

In another advantageous embodiment of the invention, FIG. 5*b* shows a combined reception system as described in FIG. 4, but with a diversity unit 26 separate from the receiver circuit 2. This design is similar to that shown in FIG. 5*a*, with separate HF-IF parts 12*a*, *b*, situated in the unit, for the two satellite radio signals. The diversity unit has at least two level indicators 6*a*, and 6*b*, the computer device 7, switching elements S1, S2, . . . and the phase rotation elements Φ1, Φ2, . . . Φ4. The diversity unit also includes a summation or combination circuit 5 and standard-type receiver circuit 2.

A reception system without antenna diversity—in other words with only one antenna—can be supplemented, by bringing the diversity unit 26 into a reception system. The receiver produced in standard manner, as a reception circuit 2, is connected with the diversity unit 26 by way of the receiver line 28, in which unit there are separate HF-IF parts 12*a*, and 12*b* for the two satellite radio signals, the level indicators 6*a*, and 6*b*, the computer device 7, as well as the switching elements S1, S2 . . . , and the phase rotation elements Φ1, Φ2 . . . with the subsequent summation or combination circuit 5. The summed or combined signal 14 is therefore passed not only to the HF-IF parts 12*a*, 12*b* situated in the diversity unit 26, but also to the receiver circuit 2, by way of the receiver line 28. One advantage of this design is that a simple reception system having only one antenna can be supplemented to produce a reception system having multiple antennas, in simple manner.

Of course, phase alignment can only be produced for one of the two satellite radio signals at any point in time. Therefore, a suitable algorithm is stored in the memory of the computer device 7, wherein this algorithm is first checked to determine whether the existing setting of the switching elements S1, S2 . . . and the phase rotation elements Φ1, Φ2 . . . yielded a sufficiently great reception level for the two satellite signals. Thus, the received symbols of the two signals are correctly detected in the receiver. If level fading is found for one of the two satellite signals, then phase alignment is produced for this satellite signal. After a subsequent test of the levels of the two satellite signals, the setting of the switching elements S1, S2 . . . and the phase rotation elements Φ1, Φ2 . . . is retained if the level of both signals is sufficient. If both satellite signals are subject to level fading at the same time, then it is practical to bring about phase alignment for the stronger of the two signals, so that it is ensured that the data flow from the satellite to the receiver takes place in secured manner, by way of one of the two signals. Thus, the result is achieved, by means of continuous testing at the level test cycle time intervals $T_z$ as described, that simultaneous reception of both satellite signals is constantly present, with great likelihood, in the Rayleigh reception field.

If the reception system is to be provided for the reception of only one radio channel, then the separate diversity system 26 configured accordingly in a manner analogous to FIG. 5*b* can be used, as is evident from FIG. 5*a*. In place of the multiple HF-IF parts 12*a*, *b* and the multiple level indicator 6*a*, *b*, only one HF-IF part 12 and one level indicator 6 are therefore used, in each instance.

Figure 6:
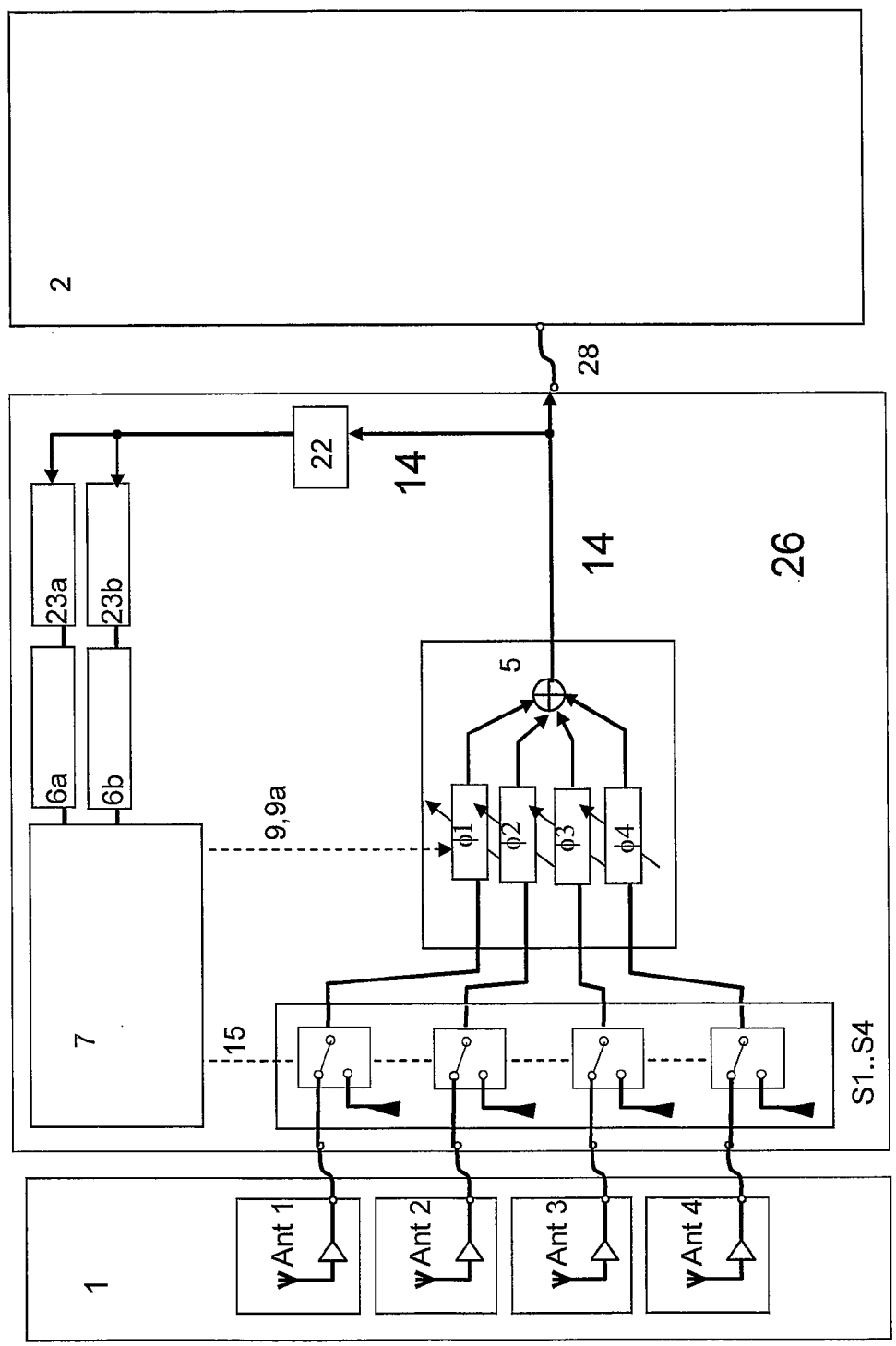
FIG. 6 is a schematic block diagram of the system shown in FIG. 5B having a multi-channel frequency converter.

FIG. 6 discloses a schematic block diagram of reception system that is similar to that shown in FIG. 5*b*. However, this design further comprises a multi-channel frequency converter 22 that is used in the combined reception system in FIG. 6, in place of the separate HF-IF parts 12*a*, 12*b*. This frequency converter is used for joint frequency conversion of the two satellite signals into frequencies that are different from one another, in a lower frequency plane (intermediate frequency plane). The levels of the two satellite signals are determined separately with subsequent band pass filters 23*a*, 23*b* that correspond to these two frequencies, to separate these signals at the output of the multi-channel frequency converter 22, and with separate level indicators 6*a*, 6*b*.

Figure 7:
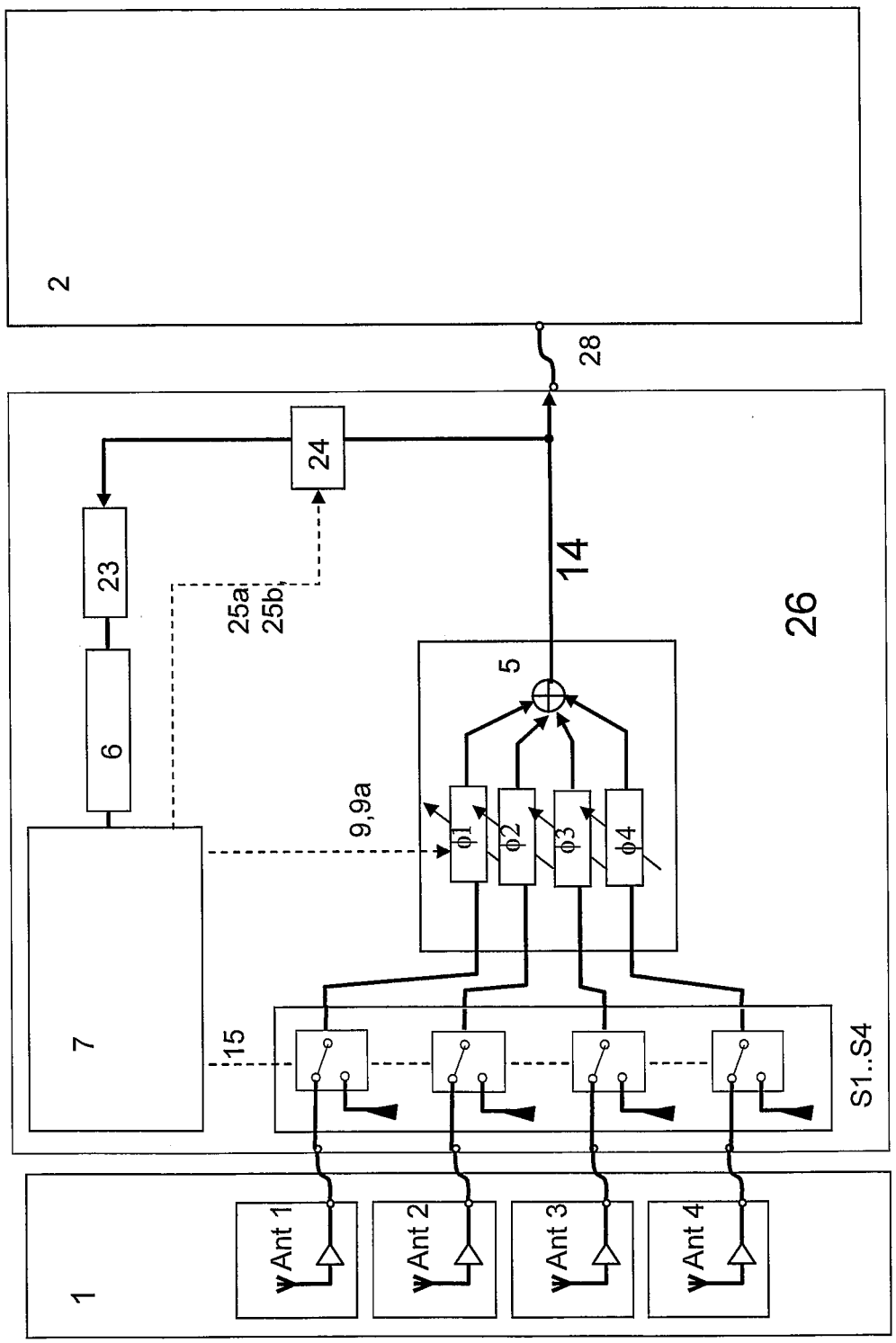
FIG. 7 is a schematic block diagram of another embodiment of an antenna system which is similar in design to the system shown in FIG. 6, however this embodiment includes a mono-channel frequency converter.

FIG. 7 shows a schematic block diagram of another embodiment. For example, to further develop the efficiency of the reception system in FIG. 6, a controllable mono-channel frequency converter 24 is used in the arrangement in FIG. 7, in place of the multi-channel frequency converter 22, for alternative setting to the frequency of the satellite reception signal that is present on the primary side, in each instance. This occurs in such a manner that a signal in the lower frequency plane occurs at its output, which signal is passed to the single level indicator 6 by way of the band pass filter 23. In the computer device 7, channel selection signals 25*a* and 25*b*, respectively, are generated, which determine both the cycle and the selection of the signal to be tested for the two satellite channels.

Figure 8:
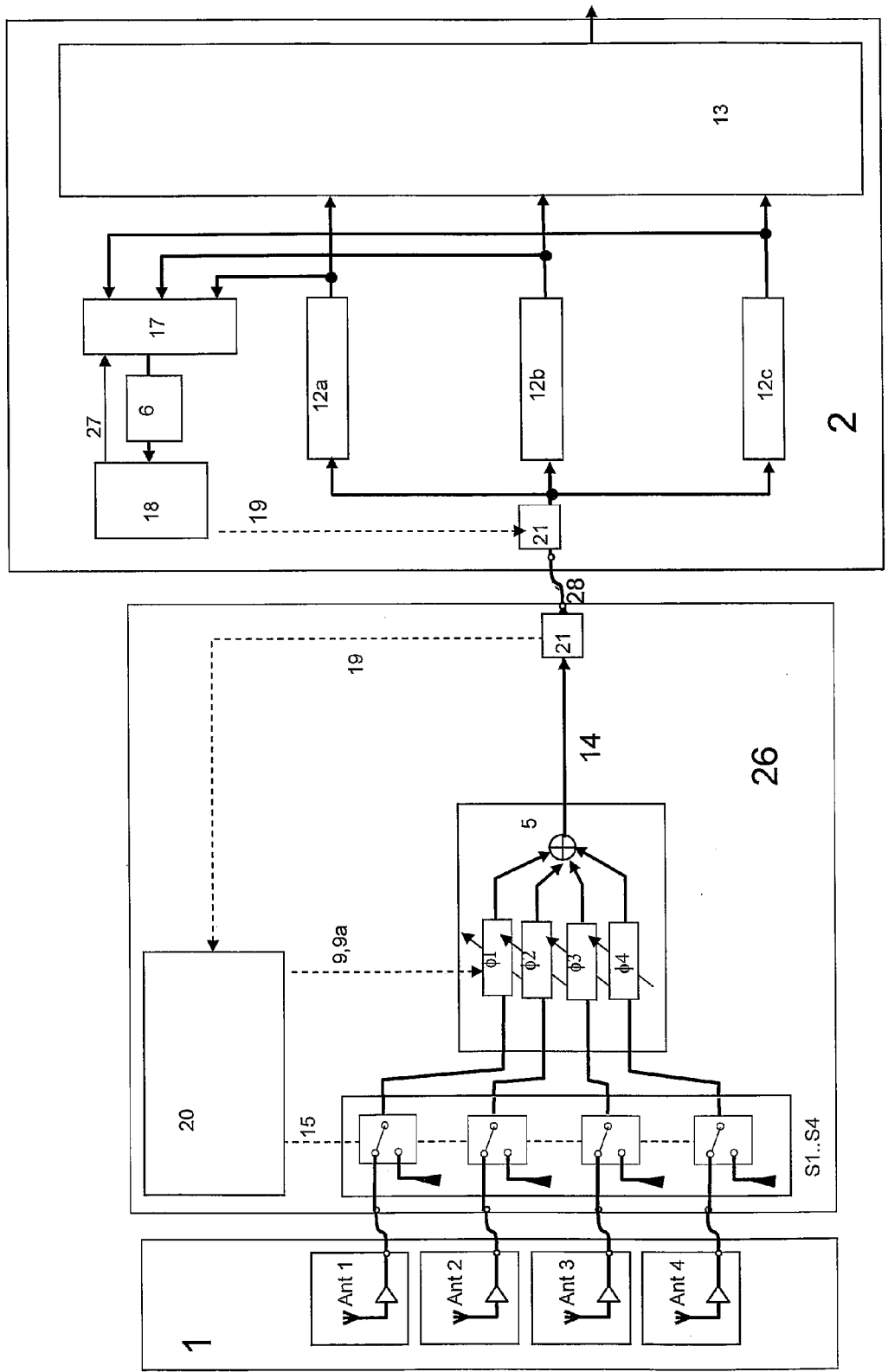
FIG. 8 is a schematic block diagram of a combined reception system similar to the embodiment disclosed in FIG. 5A wherein the reception circuit has a microprocessor.

FIG. 8 shows a schematic block diagram of another embodiment. This embodiment discloses a combined reception system as in FIG. 5*b*, but with a modified standard-type reception circuit 2 with a microprocessor 18 for generating cycle signal 27 and controlling a cycled level test change-over switch 17, for separate determination of the level in question with the level indicator 6. The microprocessor 18 takes over partial tasks of the computer device 7 and sends digital signals 19 to a simple switching logic 20 situated in the separate diversity unit 26, by way of the frequency setting switches 21 and the receiver line 28, to generate the phase setting signals 9 and the switch setting signals 15.

In this embodiment, the HF-IF parts 12*a*, 12*b* are removed from diversity unit 26 to simplify the separate diversity unit

26. For this purpose, the HF-IF parts 12*a*, 12*b* that are situated in receiver 2 are supposed to be used in connection with a fitting for subsequent expansion of the reception system. For this purpose, receiver circuit 2 has a microprocessor 18 In the interests of efficient configuration of the level tests, a cycled level test switch 17 is furthermore used in the receiver circuit 2, which switch alternatively switches the reception signals to be tested in terms of their level through to the single level indicator 6, and is controlled by the microprocessor 18 by way of cycle signals 27 for generating the test cycles. The signals given off by the level indicator 6 to the microprocessor 18 are processed there and passed to a simple circuit logic 20 situated in the separate diversity unit 26, in the form of digital signals 19 by way of the frequency setting switches 21 and the receiver line 28, in which logic the phase setting signals 9 for setting the phase rotation elements $\Phi\mathbf{1}, \Phi\mathbf{2} \ldots$ and the switch setting signals 15 for setting the switching elements $\mathbf{S1}, \mathbf{S2} \ldots$ are generated.

In the case of a QPSK symbol duration $T_{sp}=1/(4\text{ MHz})=0.25\text{ μs}$, there is a relative number of only $R \cdot (T_{sp}/T_z)=R/1000$ of symbols for R level tests, which, although they are not received with an optimally available reception signal, correct symbol identification of the predominant majority of these signals is still likely nevertheless, because of the statistics of the reception field. The few symbols that might be subject to incorrect identification in this connection are corrected by means of the redundancy that exists in every digital communication system, with error correction. The other symbols that were transmitted during the test cycle time interval $T_z$, on the other hand, are received with the full diversity effect of the available reception signals. With this, great diversity efficiency is achieved with a suitable configuration of the antennas in the multi-antenna system 1, which efficiency brings about a great reduction in the bit error rate over the travel distance and greatly reduces the likelihood of a break-down in the radio connection, with the difficulties of resynchronization.

Figure 9:
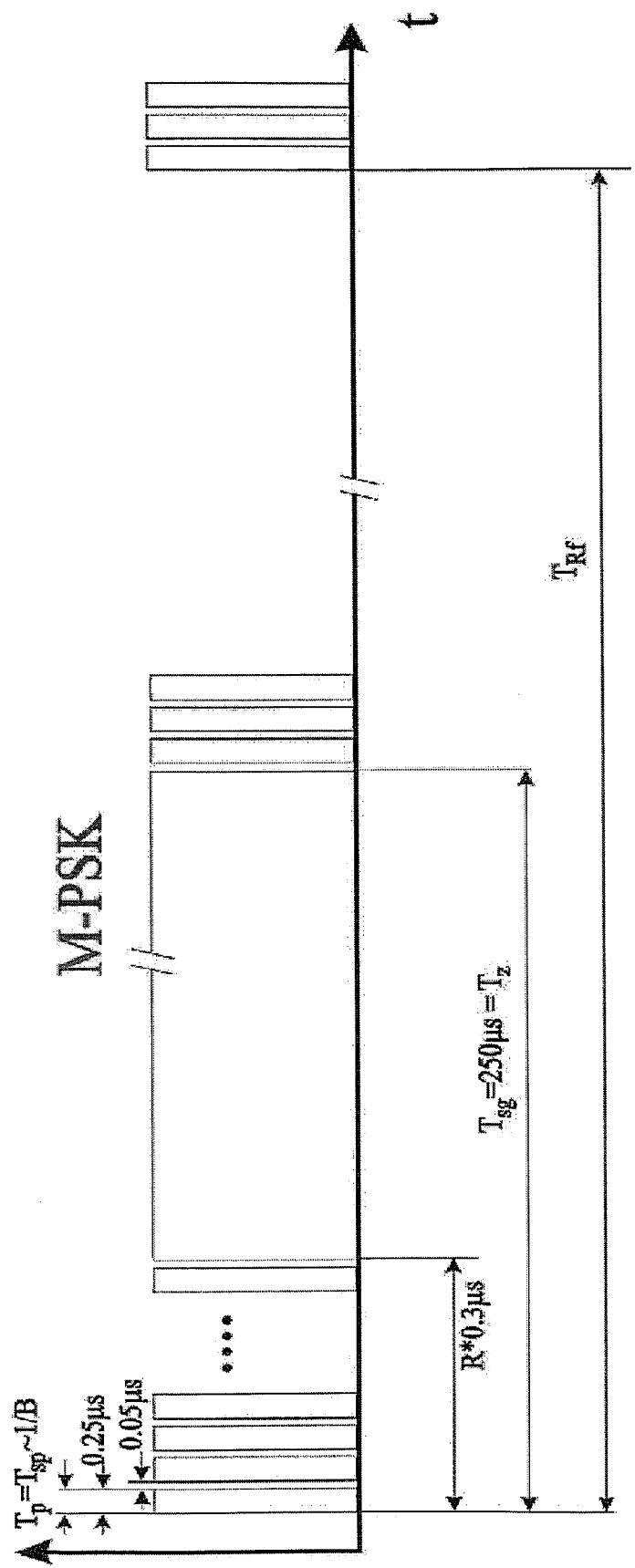
FIG. 9 is a symbol cycle of an MPSK data stream.

In FIG. 9, the QPSK symbol duration is presumed to be $T_{sp}=1/B$. In a disadvantageous case, the level test duration $T_p$ lasts as long as a few symbols, so that these can be lost during the testing time. Furthermore, there is shown the time progression for R level test procedures as well as a test cycle time interval $T_z$ selected. In an advantageous embodiment, the level tests for phase alignment are performed only if the signal/noise ratio goes below a value that lies far above the threshold at which completely reliable symbol recognition is no longer guaranteed, in order to avoid unnecessary level tests. For example, FIG. 9 shows a Symbol cycle of an MPSK data stream for the example of a radio channel having the band width B=4 MHz and a symbol duration $T_{sp}$ that corresponds to a level test time $T_p \leq 1/B$. Updating of the phase alignment after $\lambda/20$, in each instance, at a driving speed of about 100 km/h, corresponds to a level test cycle time interval $T_z$ of approximately 250 μs at an HF carrier frequency of 2.3 GHz.

In the following, the description describes methods that can be used to bring about phase alignment of N reception antennas using the level signals 4. With this design, the corresponding power values of the reception signals can be measured directly in the level indicator 6, or the squares of these values can be determined in the computer device 7, from the corresponding amplitudes of the signals.

The antenna signal $E_i$, e.g. for antenna i, is applied, in each instance, after the phase rotation elements $\Phi\mathbf{1}, \Phi\mathbf{2}, \ldots \Phi\mathbf{N}$, behind the antennas and their switching elements $\mathbf{S1}, \mathbf{S2}, \ldots$ SN, with the complex amplitude $\underline{A}_i$ and the amplitude amount $A_i$:

$$\underline{A}_i = A_i e^{j(\omega t + \phi_i + \phi_c(t))} \text{ with } i=1, 2, \ldots N \quad (1a)$$

In this connection, the phase contribution $\phi_i$ is the phase of the individual antenna i being considered, in each instance, which varies due to the response differences between the individual antennas, while the phase contribution $\phi_c$ is used for the data transmission of the radio channel being considered, and specifically represents a value that is variable over time, but is nevertheless common to all of the individual antennas.

In normal reception operation, the antenna signals $E_i$ are summed up (superimposed) and the superimposition signal $E_{norm}$ is formed, with the complex amplitude $\underline{A}_{norm}$ and the amplitude amount $A_{norm}$:

$$A_{norm} = \sum_{i=1}^{N} A_i e^{j(\omega t + \phi_i + \phi_c(t))} = A_{norm} e^{j(\omega t + \phi_{norm} + \phi_c(t))} \quad (1b)$$

A phase center results from the weighted average of the phases $\phi_i$ of the individual antennas, as phase $\phi_{norm}$ of the superimposition signal $E_{norm}$ from the superimposition of all n antennas. The weightings result from the amplitude values of the individual antennas. This phase $\phi_{norm}$ is therefore applied in normal reception operation, and the phases $\phi_i$ of the individual antennas are to be made to follow this phase, using the method according to the invention.

Tests are now carried out, at regular time intervals, to check to what extent the phases $\phi_i$ of the individual antennas differ from the phase $\phi_{norm}$ of the superimposition signal, in the sense of phase adjustment of the antenna signals. For this purpose, different test phases take place with the level test duration $T_p$, in each instance, one after the other, in which test phases a different combination of individual antennas is selected using the switches $\mathbf{S1}, \mathbf{S2}, \ldots$, n each instance. The power values $P_{ü}$, or the amplitudes $A_{ü}$, respectively, of the superimposition signals $E_{ü}$ of the different antenna combinations that are formed in this manner can then be measured. Subsequently, a conclusion concerning the phase difference between the phases $\phi_i$ of the individual antennas and the phase $\phi_{norm}$ can then be drawn from the levels $A_{ü}$ of the superimposition signals formed in the different test phases.

After these test phases, the phases $\phi i = \Phi\mathbf{1}, \Phi\mathbf{2}, \ldots$ of the individual antennas $i=1, 2, \ldots$, in each instance, are subsequently adapted to the phase of the superimposition signal $\phi_{norm}$ using the phase setting elements $\phi\mathbf{1}, \phi\mathbf{2}, \ldots$ Antennas that have weak reception and cannot make a positive contribution to the signal/noise ratio of their superimposition signal because of their amplifier noise can be switched away in this connection. The antenna signals of all the other antennas, which have been adapted to one another in terms of their phase, are then superimposed again, and in this way form a new superimposition signal, which does not deviate significantly from the old superimposition signal, in terms of phase, and possesses a greater amplitude, i.e. an improved signal/noise ratio, in comparison with the latter.

The arrangement according to the invention, according to FIG. 1, opens up a great number of possible test phases and practical antenna combinations, with which superimposition signals can be formed to determine phase differences.

In the following, some methods are described as to how the phase deviation $\alpha_i = \phi_i - \phi_{norm}$ between the phase of the antenna i and the phase of the superimposition signal $E_{norm}$ can be determined.

Method 1:

In a test phase 1, only antenna i is switched on and its signal level $A_i$ is determined at the detector. In test phase 2, only antenna k is switched on and its signal level $A_k$ is determined at the detector. In test phase 3, only antennas i and k are switched on, thereby making it possible to determine the level $A_{üi,k}$ of the superimposition signal of these two antennas at the detector. In FIG. 10a, the complex amplitudes are shown in an example. The values for $\cos(\phi_i-\phi_k)$ then result from the amplitudes $A_i$ and $A_k$ and the amplitude $A_{üi,k}$, in accordance with the cosine theorem, as follows:

$$\cos(\phi_i - \phi_k) = \frac{A_{iii,k}^2 - A_i^2 - A_k^2}{2A_iA_k} \tag{2a}$$

i.e. from the power values $P_i$ and $P_k$ of the individual antennas measured at the detector, and the power value $P_{üi,k}$ of the superimposition signal of these two antenna signals, with $$\cos(\phi_i - \phi_k) = \frac{P_{iii,k} - P_i - P_k}{2\sqrt{P_iP_k}} \tag{2b}$$

In order to measure the levels/power values of the individual antennas or the antenna combinations, respectively, at the detector, these values can be averaged over the time duration $T_p$ of the test phase, in each instance. During the time $T_p$, the phase $\phi_c$ can vary within the framework of data transmission, without any change occurring in the conditions that are considered in Equ. (2a) and (2b). For example, in the case of transmission of digital data, $T_p$ can therefore be selected to be greater than the symbol duration $T_{sp}$, since all of the relationships being considered are independent of the current phase position of the symbols. Therefore, averaging can take place over any desired amount of symbol lengths $T_{sp}$, as long as the phase and the amplitude of the signals does not change significantly during the duration of the averaging.

Therefore, only the amplitude progression over time as well as the progression of the phase difference between the antennas are restrictive for the length $T_p$ of the test phase.

Now the values $\cos(\phi_i-\phi_k)$ can be determined one after the other for all of the antenna combinations i and k, and therefore $|\phi_i-\phi_k|$ can be determined. After the phase difference $|\phi_i-\phi_k|$ is known, the phases of the antenna signals i and k can now be adapted to one another, using the phase setting elements assigned to them. Since the sign of the phase difference is not known at first, the adaptation is carried out, at first, assuming a positive sign. If the amplitude $A_{üi,k}$ of the superimposition signal does not become greater in this connection, the adaptation must subsequently be carried out with a negative sign.

FIG. 10a shows the relationship between the phase difference $\alpha_i$ and the phase differences between the antenna signals.

Figure 10B:
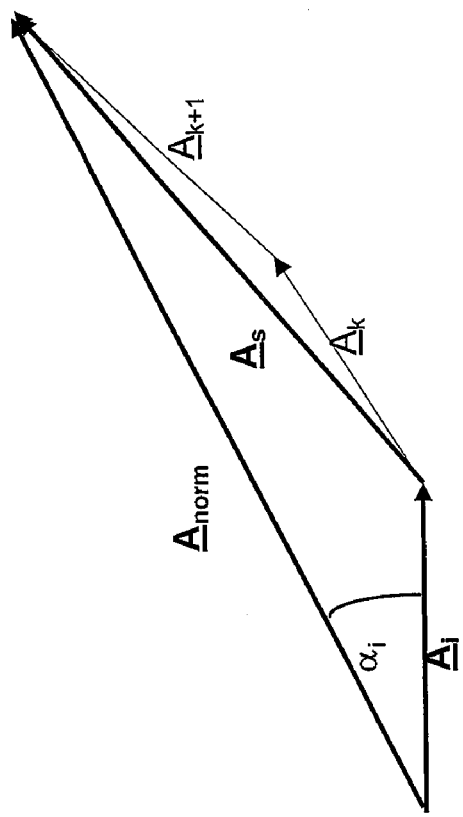
FIG. 10B discloses a vector diagram showing the relationship between the phase difference angle and the amplitude of the antenna signal and the amplitude of the sum signal.
Figure 10A:
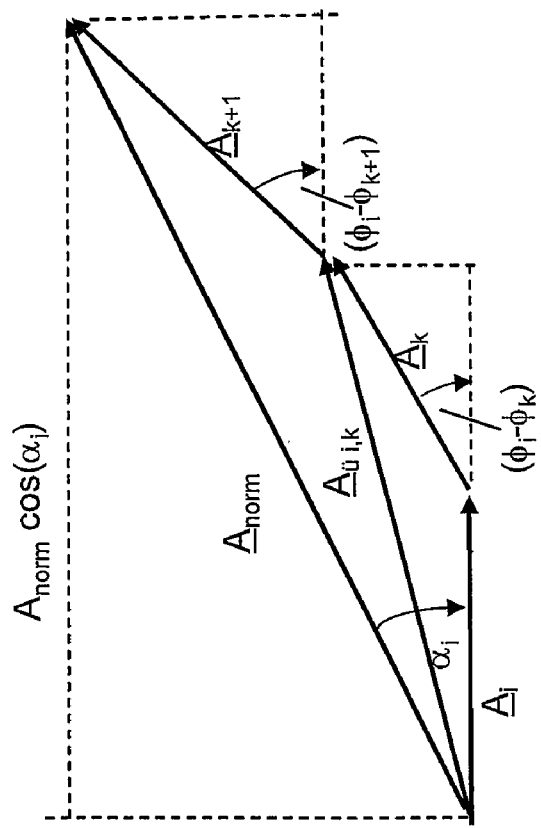
FIG. 10A discloses a vector diagram showing the relationship between a phase difference angle and phase differences between the antenna signals.

Alternatively, adaptation of antenna signal $E_i$ to the superimposition signal $E_{norm}$ can be achieved, in each instance, in a similarly simple form, in that antenna i is switched on in a test phase 1, as before, while all of the antennas other than antenna i are switched on in test phase 2, and form a sum signal with the amplitude $A_s$ by superimposition (FIG. 10b).

The values for $\cos(\alpha_i)$ then result from the amplitudes $A_i$ and $A_s$ and the amplitude $A_{norm}$, in accordance with the cosine theorem, as follows:

$$\cos(\alpha_i) = \frac{A_i^2 + A_{norm}^2 - A_s^2}{2A_iA_{norm}} \tag{2d}$$

i.e. from the power values $P_i$ and $P_k$ of the individual antennas measured at the detector, and the power value $P_{üi,k}$ of the superimposition signal of these two antenna signals, with $$\cos(\alpha_i) = \frac{P_i + P_{norm} - P_s}{2\sqrt{P_iP_{norm}}} \tag{2e}$$

After the phase difference $|\alpha_i|$ is known, the phase of the antenna signal $E_1$ can now be adapted to the phase of the superimposition signal $E_{norm}$, to one another, using the phase setting element assigned to the antenna i. Since the sign of the phase difference is not known at first, the adaptation is carried out, at first, assuming a positive sign. If the new amplitude $A_{norm}$ of the superimposition signal that results from this does not become greater in this connection, the adaptation must subsequently be carried out with a negative sign.

Method 2:

In another advantageous method, it is possible to do without switching away antennas during the test phases, in part or even completely. For this purpose, not only the combinations of antennas are varied from test phase to test phase, but also and particularly, their phase settings are varied. These phase settings can be brought about by means of targeted phase change, by way of the phase setting elements $\phi 1$, $\phi 2$, $\phi 3$, $\phi 4$. In each test phase 1, 2, 3, ..., a different test setting of the antennas is therefore selected, with regard to their phases, and the amplitude of the superimposition signal $A_{t1}$, $A_{t2}$, $A_{t3}$, ... that results from this is measured at the detector.

Test setting 1 is, for example, the normal operation of reception (FIG. 11a). The amplitude $A_{t1}=A_{norm}$, or the power value $P_{t1}$, respectively, is read off at the detector. Now the phase difference $\alpha_i$ between the antenna signal $E_i$ and the superimposition signal $E_{norm}$ must be determined, so that it can be compensated in a correction procedure, by means of the phase rotation elements. For this purpose, two additional test settings are generated, using the phase rotation elements:

In test setting 2, the phase of the antenna signal i is rotated by an angle $-\Delta\phi_{t2}$ that is known to the system, and the amplitude $A_{t2}$, or the power value $P_{t2}$, respectively, is read off at the detector (FIG. 11b).

Figure 11C:
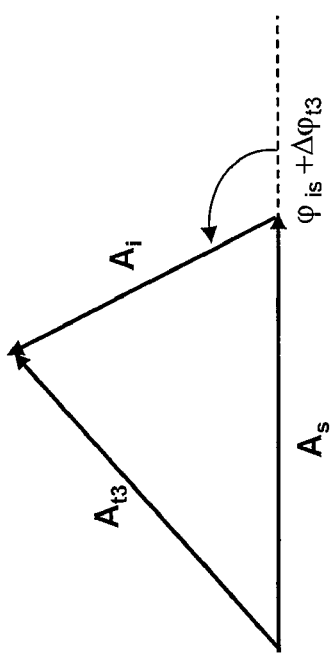
FIG. 11C is a vector diagram of a third test position.

In test setting 3, the phase of the antenna signal i is rotated by an angle $-\Delta\phi_{t3}$ that is known to the system, and the amplitude $A_{t3}$, or the power value $P_{t3}$, respectively, is read off at the detector (FIG. 11c).

In order to keep the computer effort for the determination of $\alpha_i$ low and to be able to select a rough angle resolution of the phase setting elements that is simple to implement, the following is advantageous for the phase rotations of the test settings 2 and 3 (s. FIG. 11b and c):

$$\Delta\phi_{t2}=\Delta\phi_{t3}=\Delta\phi_t$$

In the following derivation, such an advantageous embodiment is assumed.

The amplitude relationship then applies for the three test settings (according to the cosine theorem):

$$A_{t1}^2=A_i^2+A_s^2+2A_iA_s\cos(\phi_{is})$$

$$A_{t2}^2=A_i^2+A_s^2+2A_iA_s\cos(\phi_{is}-\Delta\phi_t)$$

$$A_{t3}^2=A_i^2+A_s^2+2A_iA_s\cos(\phi_{is}+\Delta\phi_t)$$

or the corresponding power output relationships, respectively:

$$P_{t1} = P_{norm}$$

$$P_{t1} = P_i + P_s + 2\sqrt{P_i P_s}\cos(\phi_{is}) \quad (3a)$$

$$P_{t2} = P_i + P_s + 2\sqrt{P_i P_s}\cos(\phi_{is} - \Delta\phi_t) \quad (3b)$$

$$P_{t3} = P_i + P_s + 2\sqrt{P_i P_s}\cos(\phi_{is} + \Delta\phi_t) \quad (3c)$$

we introduce the auxiliary function $P_x$:

$P_x = -2\sqrt{P_i P_s}\cos(\phi_{is})$ which can be determined from $$P_x = \frac{P_{t2} + P_{t3} - 2P_{t1}}{2 - 2\cos(\Delta\varphi_t)} \quad (4)$$

Furthermore, we introduce the auxiliary function $P_y$:

$P_y = 2\sqrt{P_i P_s}\sin(\phi_{is})$ which can be determined from $$P_y = \frac{P_{t2} - P_{t3}}{2\sin(\Delta\varphi_t)} \quad (5)$$

From equations (3-5), we obtain:

$$P_i = \frac{1}{2}\left[P_{t1} + P_x \pm \sqrt{P_{t1}^2 + 2P_{t1}P_x - P_y^2}\right] \quad (6)$$

as well as $$P_s = \frac{1}{2}\left[P_{t1} + P_x \mp \sqrt{P_{t1}^2 + 2P_{t1}P_x - P_y^2}\right] \quad (7)$$

Therefore there are two solutions, whereby the one solution represents the actual power at the antenna, while the other solution represents the power of the superimposed additional antennas. At first, these solutions cannot be differentiated from one another. However, the angles $\alpha_i$ and $\alpha_s$ can be determined from the two solutions, whereby here it is also not known, at first, which of the two angle solutions is the angle $\alpha_i$ and which is the angle $\alpha_s$.

For the phase difference angle $\alpha_i$ between the antenna i and the superimposition signal, there is the calculation formula:

$$\cos(\alpha_i) = \frac{2P_i - P_x}{2\sqrt{P_{t1}P_i}} \quad (8)$$

$$\text{and } \sin(\alpha_i) = \frac{P_y}{2\sqrt{P_{t1}P_i}} \quad (9)$$

or $$\tan(\alpha_i) = \frac{P_y}{2P_i - P_x} = \frac{P_y}{P_{t1} \pm \sqrt{P_{t1}^2 + 2P_{t1}P_x - P_y^2}}, \quad (10)$$

respectively.

The quadrant of the angle $\alpha_i$ can easily be concluded from a size comparison:

If $2P_i > P_x$ applies, then $\alpha_i$ lies in the first or fourth quadrant, otherwise it lies in the other two quadrants. If $P_y > 0$ applies, then $\alpha_i$ lies in the first or third quadrant, otherwise it lies in the other two quadrants.

Also, it holds true for $\alpha_s$:

$$\cos(\alpha_s) = \frac{2P_s - P_x}{2\sqrt{P_{t1}P_s}} \quad (11)$$

$$\text{and } \sin(\alpha_s) = \frac{P_y}{2\sqrt{P_{t1}P_s}} \quad (12)$$

or $$\tan(\alpha_s) = \frac{P_y}{2P_s - P_x} = \frac{P_y}{P_{t1} \mp \sqrt{P_{t1}^2 + 2P_{t1}P_x - P_y^2}}, \quad (13)$$

respectively.

Without prior knowledge of the power values $P_i$ and $P_s$, there are therefore two solutions for $\alpha_i$, according to Equ. 10 and 13, respectively, whereby the one solution represents the actual phase difference $\alpha_i$, while the other solution represents the phase setting $\alpha_s$.

In the subsequent correction procedure, one of the two solutions of $\alpha_i$, which results from Equ. 10, is used for phase alignment of the antenna i, on a trial basis.

Since the angles $\alpha_i$ and $\alpha_s$ are fundamentally directed opposite one another, a reduction in the power of the superimposition signal will occur if the wrong solution is chosen. This can be recognized quickly, and corrected by means of choosing the other solution, in other words the correct one. The optimized higher power of the new superimposition signal then occurs.

Alternatively, the two solutions can fundamentally be tested through, one after the other, whereby in the final analysis, the solution whose superimposition signal has the greater power is used.

To be able to fundamentally preclude an incorrect phase change of antenna signals in the diversity process, the increase in the power of the superimposition signal that results from the correction can be used as a plausibility criterion for the quality of the correction. The correction is fundamentally maintained only if the superimposition signal resulting from it is greater than before application of the correction.

Then one can also assume that the phase of the individual antennas was appropriately adapted to the phase of the superimposition signal that was already present before the correction.

Now it can happen that data losses occur (even if they are short-term), if the wrong one of the two angle solutions is used first in the correction procedure. A phase error occurs for a short period of time, which error appears as a data error in the receiver, for example in the case of an M-PSK transmission. In order to avoid this, the method of procedure can be as follows:

The test settings 1, 2, and 3 are run through with small angle steps $\Delta\phi_{t2} = \Delta\phi_{t3} = \Delta\phi_t \ll 90°$, until levels that can be precisely measured can be measured at the power detector for every case. (During this time, however, only a natural phase change is allowed to occur, which is clearly less than the angle steps $\Delta\phi_{t2} = \Delta\phi_{t3} = \Delta\phi_t$.

To obtain a clear solution without a subsequent test, another test setting 4 can be introduced, right from the start, in which the antenna i is attenuated with the value a, in targeted manner, by way of an attenuation element, and then the level $P_{t4}$ is measured, whereby the attenuation must be selected to be low enough so that only a natural phase change occurs also during this test phase, which change is clearly less than the angle steps $\Delta\phi_{t2}=\Delta\phi_{t3}=\Delta\phi_t$.

In addition to the Equ. (1-3), the test setting 4 is obtained with:

$$P_{t4}=\alpha P_i+P_s+2\sqrt{\alpha P_i P_s}\cos(\phi_{is}) \tag{14}$$

After sequentially carrying out the test settings 1-4, a clear solution for the phase difference $\alpha_i$ can now immediately be obtained from Equations (1-3) and (14):

There is now a solution for the power of the antenna i with $$P_i = \frac{P_{t1} - P_{t4}}{1-a} + \frac{P_x}{1+\sqrt{a}} \tag{15}$$

from which the phase difference $\alpha_i$ can clearly be determined, using Equ. (8) and (9). In a subsequent correction, the antenna signal $E_i$ can therefore be rotated into the phase of the superimposition signal, in terms of its phase, by the phase difference $\alpha_i$ that has just been calculated. After all of those antenna signals that can make a positive contribution to the signal/noise ratio because of their level have been adapted to the superimposition signal in terms of their phase, a higher level value is obtained for the resulting new superimposition signal. Discrete phase rotation elements for correcting the phases of the antenna signals are selected, with sufficiently small angle steps so that the phase of the new superimposition signal cannot bring about a phase jump, as compared with the phase of the previous superimposition signal, of such a size that a bit error could occur in the case of MPSK modulation.

It is important for the test phases to proceed rapidly enough so that the phases and amplitudes of the antenna signals do not change significantly during the test phases. However, this is a given in most transmission systems, since the data rates are necessarily greater by many magnitudes than the phase changes, in rotations per time unit, since otherwise, no receiver-side interpretation of the data would be possible. In order to be able to receive the data, receivers must be able to determine the phase setting and the amplitude during a symbol duration.

In other words, it is always possible, using the diversity circuit according to the invention, to determine the phase differences between the antenna signals and the superimposition signal during a time duration of a few symbol durations, in sequence, without a disruptive phase rotation occurring during this relatively short period of time, due to external circumstances.

Particularly Advantageous Method 3:

In an advantageous embodiment, which can be implemented in particularly simple manner, discrete phase rotation elements are used, which can bring about only discrete phase rotations with a step width $\Delta\phi$, in each instance. It is a good possibility, in the sense of the simplest possible computer effort and simple hardware implementation, to select the test angle rotation at $\Delta\phi_t=90°$, the step width 90°, and for the discrete phase rotation elements, in the case of MPSK modulated signals, to implement a step angle width of $\Delta\phi=360°/(M*A)$ with $A=1, 2, 3 \ldots$ In the case of QPSK, for example, a step angle width of 90° or 45°, in particular, is a good possibility.

Now, the superimposition of all of the antenna signals in the normal reception case is again selected as test setting 1.

$$P_{t1}=P_{norm} \tag{16}$$

$$P_{t1}=P_i+P_s+2\sqrt{P_i P_s}\cos(\phi_{is}) \tag{17}$$

in test setting 2 the antenna signal i is measured individually (i.e. antenna signal $P_s$ is infinitely attenuated):

$$P_{t2}=P_i \tag{18}$$

At this point, it can be decided for every antenna signal $E_i$ whether its level is high enough to continue to be included in consideration. Here, those antenna signals that would make a negative contribution to the signal/noise ratio, at low signal level, by way of their amplifier noise, can be switched away at an early point in time and left out of consideration until the next test pass. If one or more antenna signals are switched away, test setting 1 must be carried out once again for the new reduced combination of antenna signals. Alternatively, the sequence of all test settings can fundamentally be changed around. Accordingly, it is a good possibility to put test setting 2 at the beginning of the test phase in the time progression, in order to already take antenna signals out of consideration, if necessary.

In test setting 3, the superimposition of all the antenna signals is measured after the antenna signal i is shut off (i.e. antenna signal $E_i$ is infinitely attenuated):

$$P_{t3}=P_s \tag{19}$$

In test setting 4, the superimposition of all the antenna signals is measured, after the antenna signal $E_i$ was rotated by $\Delta\phi_t=90°$. Therefore, Equ. 2 yields:

$$P_{t4}=P_i+P_s+2\sqrt{P_i P_s}\sin(\phi_{is}) \tag{20}$$

Figure 12:
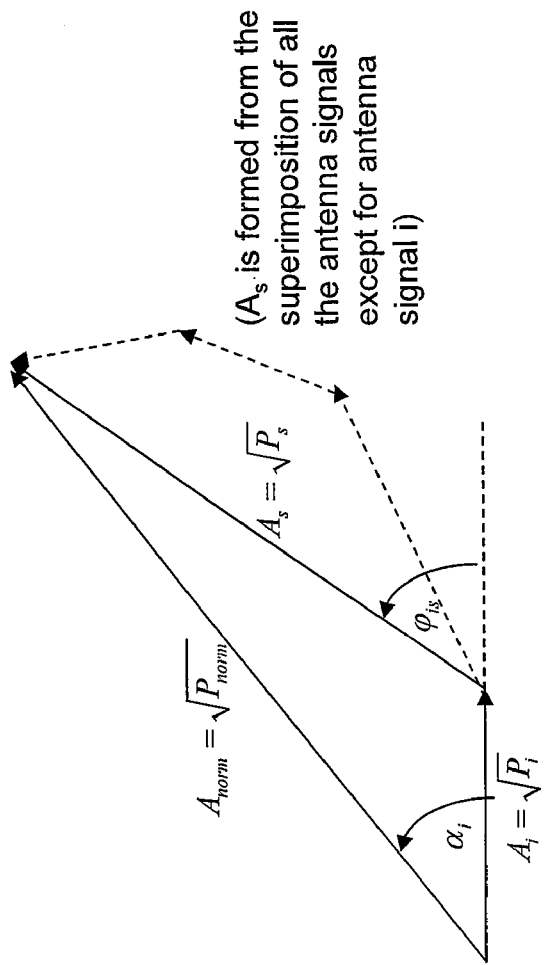
FIG. 12 is a vector diagram showing the relationship between the phase differences and the amplitude of antenna signals, the amplitude of the antenna sum signal, and all other antenna signals, and the amplitude of the sum signal of all the antenna signals.

According to FIG. 12, we obtain $$\sqrt{P_{norm}}\sin(\alpha_i)=\sqrt{P_s}\sin(\phi_{is}) \tag{21}$$

as well as $$P_{t1}=P_i+P_s+2\sqrt{P_i P_s}\cos(\phi_{is}) \tag{3a}$$

$$\sqrt{P_{norm}}\cos(\alpha_i)=\sqrt{P_s}\cos(\phi_{is})+\sqrt{P_i} \tag{22}$$

From (21) and (22), we obtain $$\tan(\alpha_i) = \frac{2\sqrt{P_i P_s}\sin(\varphi_{is})}{2\sqrt{P_i P_s}\cos(\varphi_{is})+2P_i} \tag{23}$$

From (17), we obtain:

$$2\sqrt{P_i P_s}\cos(\phi_{is})=P_{t1}-P_i-P_s \tag{24}$$

From (20), we obtain:

$$2\sqrt{P_i P_s}\sin(\phi_{is})=P_{t4}-P_i-P_s \tag{25}$$

with (23) to (25), we obtain:

$$\tan(\alpha_i) = \frac{P_{t4}-P_i-P_s}{P_{t1}+P_i-P_s} \tag{26}$$

Thus, with (18) and (19) we obtain the following from the measured power values of the test phases 1, 2, 3, and 4:

$$\tan(\alpha_i) = \frac{P_{t4} - P_{t2} - P_{t3}}{P_{t1} + P_{t2} - P_{t3}} \quad (27)$$

this results in the following for the phase difference $\alpha_i$ to be aligned between the signal $E_i$ and the superimposition signal $E_{norm}$:

$$\alpha_i = \arctan\left(\frac{P_{t4} - P_{t2} - P_{t3}}{P_{t1} + P_{t2} - P_{t3}}\right) + n \cdot 180° \quad (28)$$

$$\text{with } n \begin{cases} 0 & \text{for } P_{t1} + P_{t2} > P_{t3} \\ 1 & \text{for } P_{t1} + P_{t2} < P_{t3} \end{cases}$$

whereby it can be clearly determined by means of the multiplier n in what quadrant the phase difference lies.

In order to further reduce the computer effort, the function arc-tangent (abbreviation: arctan) (as well as other functions that could possibly be used for calculating the angle) can be approximated in partial regions, by means of step approximation, linear approximation or parabolic approximation, as well as in general by means of a polynomial approximation. Also, a combination of the approximations mentioned here can be selected, in such a manner that a particularly suitable approximation is used in a different partial region, in each instance. For this purpose, we introduce two auxiliary variables:

$$P_{numerator} = P_{t4} - P_{t2} - P_{t3}$$

$$P_{denominator} = P_{t1} + P_{t2} - P_{t3} \quad (32)$$

Then a value n is formed with $$n \begin{cases} 0 & \text{for } P_{denominator} > 0 \\ 1 & \text{for } P_{denominator} < 0 \end{cases} \quad (33)$$

Then the quotient Q must be formed with $$Q = \frac{P_{numerator}}{P_{denominator}} \quad (34)$$

According to Equation 27, the quotient Q must be formed for determining the angle of the arc tangent. In a very good approximation, this can also be formed by means of a combination of linear approximation and step approximation for the arctan function. For example, the following is obtained:

$$\alpha_i = n \cdot \pi + \begin{cases} Q & \text{for } |Q| < 0.7 \\ 0.25Q + 0.525 & \text{for } 0.7 < |Q| < 3.25 \\ -1.35 & \text{for } -7 < Q < -3.25 \\ 1.35 & \text{for } 3.25 < Q < 7 \\ -1.5 & \text{for } Q < -7 \\ 1.5 & \text{for } Q > 7 \end{cases} \quad (35)$$

for permitted deviations of up to 5° in the determination of the angle, or with $$\alpha_i = n \cdot \pi + \begin{cases} Q & \text{for } |Q| < 0.66 \\ 0.25Q + 0.5 & \text{for } 0.66 < |Q| < 3.8 \\ -1.445 & \text{for } Q < -3.8 \\ 1.445 & \text{for } Q > 3.8 \end{cases} \quad (36)$$

for allowed angle deviations of up to 8°.

Particularly Advantageous Method 4:

Another alternative with little computer effort consists in selecting another advantageous combination of test settings as follows:

As before, the power $P_{t1} = P_{norm}$ of the superimposition signal $E_{norm}$ is measured in accordance with Equ. (16) and (17), in test setting 1. Likewise as before, the power $P_{t2} = P_i$ is measured in accordance with Equ. (18) for each individual antenna signal $E_i$, in test setting 2. In test setting 3, the superimposition of all the antenna signals is measured after antenna signal $E_i$ was rotated by $\Delta\phi_r = 90°$, using the phase setting element $\Phi_i$. From Equ. (2), the following is therefore obtained:

$$P_{t3} = P_i + P_s + 2\sqrt{P_i P_s} \sin(\phi_{is}) \quad (37)$$

In test setting 4, the superimposition of all of the antenna signals is measured, as before, after antenna signal $E_i$ was rotated by $\Delta\phi_r = -90°$. Identical to Equ. 20, the following is therefore obtained:

$$P_{t4} = P_i + P_s - 2\sqrt{P_i P_s} \sin(\phi_{is}) \quad (38)$$

As before, Equ. (23) results according to FIG. 12 for the determination of the phase difference $\alpha_i$ between antenna signal $E_i$ and the superimposition signal $E_{norm}$. Furthermore, Equ. (24) also applies here. Instead of the Equ. (25) that applies in method 3, however, we now obtain the following in method 4 from Equ. (37) and (38):

$$2\sqrt{P_i P_s} \sin(\varphi_{is}) = \frac{1}{2}(P_{t3} - P_{t4}) \quad (39)$$

and also $$P_i + P_s = \frac{1}{2}(P_{t3} + P_{t4}) \quad (40)$$

with Equ. (40) and (24), we obtain:

$$2\sqrt{P_i P_s} \cos(\varphi_{is}) = P_{t1} - \frac{1}{2}(P_{t3} + P_{t4}) \quad (41)$$

From Equ. (23), we obtain, when using Equ. (39) and (41) as well as Equ. (18), which also applies here for test setting 2:

$$\tan(\alpha_i) = \frac{P_{t3} - P_{t4}}{2P_{t1} - P_{t3} - P_{t4} + 4P_{t2}} \quad (42)$$

Now, it is possible to proceed analogous to the method of procedure described above, in that formation analogous to Equ. (32) takes place $$P_{numerator} = P_{t3} - P_{t4}$$

$$P_{denominator} = 2P_{t1} - P_{t3} - P_{t4} + 4P_{t2} \quad (43a, b)$$

in order to subsequently determine the phase difference $\alpha_i$, in each instance, in accordance with Equ. (33)-(36).

The phase rotation elements $\Phi 1$, $\Phi 2$, ... are subsequently set as close as possible to a phase rotation by $\Delta\Phi_1$, $\Delta\Phi_2$, ..., in each instance, to the extent that their angle resolution allows, so that the following applies for all the antennas, with the greatest approximation:

$$\cos(\phi_i + \Delta\phi_i - \phi_{norm}) = 0 \text{ i.e. } \Delta\phi_i = -\alpha_i, i = 1, 2, \ldots N$$

and therefore all of the antenna signals are brought to the standard phase of the superimposition signal $E_{norm}$. In this way, the amplitude of the superimposition signal is increased, while its phase remains the same.

When there is reception with interference due to multi-path propagation, it is necessary, to update the phase alignment of the antenna signals in sufficiently small segments of the path distance traveled. The need for this is clearly illustrated both by the progression of the amplitudes of the reception signals of the antennas in FIG. 2B, with deep collapses in the signal levels, and from the progression of the phases of the reception signals in FIG. 2A. Both progressions show, using the raster indicated at the bottom of FIG. 2B, that the radio transmission channel can be viewed as being constant only over short distances of ½₀. The time intervals for updating the phase alignment of the signals must therefore be set in such a manner that even at the highest driving speed, the path traveled in the meantime is not significantly greater than ½₀, in order to obtain the full diversity effect achieved by means of phase alignment. For this purpose, according to the invention, a level test cycle generator 11 for generating a level test cycle signal 10, at level test cycle time intervals $T_z$, is present. The level test cycle time interval $T_z$ must therefore be selected in such a manner that at the highest driving speed, the path traveled is less than ⅕ and, for practical purposes, amounts to approximately ½₀.

With digital phase modulation, as, for example, in the case of the QPSK method, the phase of the high-frequency carrier, which is constant in amplitude, suddenly changes in the sequence of the transmitted symbols, between the quadrants of the complex plane. Because of the running time difference between the reception signals of the antennas Ant1, Ant2 ... that are affixed on the vehicle, which is small enough to be ignored, the phase jumps in the reception signals E1, E2 ... occur practically at the same time with reference to the QPSK symbol duration $T_{sp}$. With this, the difference of the phase angles between the reception signals E1, E2 ... of the individual antennas is also maintained if several different QPSK symbols are transmitted during the test level cycle, consisting of R level tests. Independent of the transmitted symbol, the amplitude of the high-frequency carrier is constant. Therefore, according to the invention, the phase between the individual reception signals of the antennas can be correctly determined according to the method indicated, and phase alignment can be brought about.

With the implementation of a system according to the invention, it is frequently necessary to bring the necessary phase settings about in the shortest possible period of time and using as few technically complicated phase setting elements and microprocessors as possible. In this connection, the exclusive use, according to the invention, of discrete phase setting elements for representing discrete angle values between 0° and 360°—as was already described under Method 3—is very helpful, because of its ease of implementation and ability to be combined well.

Under Method 3, a discrete phase rotation element with the fixed settings 0° and 90° was already introduced for the implementation of test setting 4. If combined with another discrete phase rotation element having the fixed angle values 0° and 180° that can be set, all angles with a step width of 90°, for example, can therefore be represented. Of course, phase rotation elements whose angle difference of the fixed set phase is 90°, which applies, for example, for the fixed settings −45° and +45°, can also be used. This applies analogously also to the combined phase rotation element whose angle difference amounts to the fixed set phase 180°, as it applies, for example, for the fixed settings −90° and +90°.

Of course, in the case of an MPSK modulation at A=1, with the resulting limited resolution of 360°/(M*A) (e.g. resolution 90° at QPSK) for the angle difference of the fixed set phases of the phase rotation elements, the ability of the reception system according to the present invention to set the angle $\alpha_i$ precisely to zero, in each instance, and thereby to generate the theoretically maximal sum signal with the combination of the antenna signals, is lost. As will be shown below, the accompanying level loss is not too great, so that even with this rough resolution of 360°/M angle steps (in other words 90° in the case of QPSK), the advantages that go along with the present invention are achieved. Of course, these advantages can be achieved more easily with a better resolution of 360°/(2M) angle steps (in other words 45° angle steps in the case of QPSK). As will be shown below, this resolution is already so good that it is technically completely sufficient for the angle tolerance required in an MPSK system, and that the amplitude of the resulting reception signal differs hardly at all from the amplitude that can be maximally reached in the case of infinitely small angle steps. The results that can be achieved in this manner therefore generally do not justify the application of complex continuously adjustable phase rotation elements, in any case.

With the goal of minimizing the calculation effort for determining the angle $\alpha_i$, some algorithms are indicated below, in a particularly advantageous embodiment of the invention, which make it possible to determine the angle range for the angle $\alpha_i$ with the lowest possible calculation effort, in each instance.

As a function of the system, the plurality M*A of the possible angle ranges having an angle width of 360°/(M*A) is established for $\alpha_i$, in each instance, within the framework of the MPSK method, and is therefore known. The algorithm is based on the methods of procedure indicated under Method 3, and differs, in particular, in that a threshold value is introduced and the only queried angle ranges for that value can occur as a function of the system.

For this purpose, the quotient Q according to Equation 34 is examined with regard to its value in terms of amount, as one of the possibilities. In the case of resolution A=1, the applicable possible 90 ° 360°/(4*1) angle ranges for $\alpha_i$ can then be indicated as follows for a QPSK system, for example:

$-45° < \alpha_i < 45°$: applies for value range $|Q| < 1$ and

Pdenominator>0; range w=0

$45° < \alpha_i < 135°$: applies for value range $|Q| > 1$ and

Pnumerator>0; range w=1

$135° < \alpha_i < 225°$: applies for value range $|Q| < 1$ and

Pdenominator<0; range w=2

$225° < \alpha_i < 315°$: applies for value range $|Q| > 1$ and

Pnumerator<0; range w=3 (44)

If one designates the angle ranges as indicated above in ascending order, with w=0, 1, 2, ... M−1, then according to determinations of the angle range for $\alpha_i$, the signal of the $i^{th}$ antenna in the vicinity of the phase location of the signal $A_{norm}$ is rotated in the sense of the present patent for phase alignment, by means of switching on a corresponding phase rotation element having the angle value $\Phi i = -w*360°/(M*1)$. In another advantageous embodiment of the algorithm, the formation of the quotient Q according to Equation 34, which is complicated in terms of calculations and time-consuming, is avoided, and the applicable angle range is determined using the powers Pnumerator and Pdenominator according to Equation 32. In this connection, the following relationships apply, which can be used to determine the applicable angle range within an extremely short period of time, using simple logic circuits.

−45°<$\alpha_i$<45°: applies for value range (Pnumerator<Pdenominator and Pdenominator>0 and Pnumerator>0)

or for value range (−Pnumerator<Pdenominator and Pdenominator>0 and Pnumerator<0)

angle value of phase rotation element to be set: $\Phi i = 0°$

45°<$\alpha_i$<135°: applies for value range (Pnumerator>Pdenominator and Pnumerator>0 and Pdenominator>0)

or for value range (Pnumerator>−Pdenominator and Pnumerator>0 and Pdenominator<0)

angle value of phase rotation element to be set: $\Phi i = -90°$

135°<$\alpha_i$<225° applies for value range (Pnumerator<−Pdenominator and Pdenominator<0 and Pnumerator>0)

or for value range (−Pnumerator<−Pdenominator and Pdenominator<0 and Pnumerator<0)

angle value of phase rotation element to be set: $\Phi i = -180°$

225°<$\alpha_i$<315°: applies for value range (−Pnumerator>−Pdenominator and Pnumerator<0 and Pdenominator<0)

or for value range (−Pnumerator>Pdenominator and Pnumerator<0 and Pdenominator>0)

angle value of phase rotation element to be set: $\Phi i = -270°$ (45)

In the case of another particularly effective method for determining the angle range, the sum of Pnumerator and Pdenominator (Pnumerator+Pdenominator) and the difference of Pnumerator and Pdenominator (Pnumerator−Pdenominator) are first determined, in simple manner. Using the simple logical relationships, the applicable angle range can be determined from this, in each instance.

−45°<$\alpha_i$<45°: applies for value range (difference<0 and Pdenominator>0 and Pnumerator>0)

or for value range (sum>0 and Pdenominator>0 and Pnumerator<0)

angle value of phase rotation element to be set: $\Phi i = 0°$

45°<$\alpha_i$<135°: applies for value range (difference>0 and Pnumerator>0 and

Pdenominator>0)

or for value range (sum>0 and Pnumerator>0 and Pdenominator<0)

angle value of phase rotation element to be set: $\Phi i = -90°$

135°<$\alpha_i$<225°: applies for value range (sum<0 and Pdenominator<0 and Pnumerator>0)

or for value range (difference>0 and Pdenominator<0 and Pnumerator<0)

angle value of phase rotation element to be set: $\Phi = -180°$

225°<$\alpha_i$<315°: applies for value range (difference<0 and Pnumerator<0 and Pdenominator<0)

or for value range (sum<0 and Pnumerator<0 and Pdenominator>0)

angle value of phase rotation element to be set: $\Phi i = -270°$ (46)

For the sake of completeness, a representation without prior subtraction of the powers will still be given. In this connection, the signs of sum, Pnumerator, Pdenominator, and difference are determined using the following equations.

Pdenominator<0 if Pt3>(Pt1+Pt2), Pdenominator>0 if Pt3<(Pt1+Pt2)

Pnumerator<0 if Pt4<(Pt2+Pt3),

Pnumerator>0 if Pt4>(Pt2+Pt3)

Sum<0 if 2Pt3>(Pt4+Pt1), sum>0 if 2Pt3<(Pt4+Pt1)

Difference>0 if Pt4>(Pt1+2Pt2), difference<0 if Pt4<(Pt1+2Pt2) (47)

For the case that a greater resolution is required for M=4, for example A=2 of the angle range, the same schemata as those that are shown in Equations (45)-(47) can be used in analogous manner. The angle width of the phase rotation elements must accordingly be selected $360°/(M*A)=360°/(4*2)=360°$. For example, in analogy to Equation (45), the following relationship is obtained for a resolution of $360°/(M*A)=360°/(4*2)=45°$:

−22.50<$\alpha_i$<22.50: applies for value range |Q|<0.4142 (=tan 22.5°) and

Pdenominator>0 angle value of phase rotation element to be set: $\Phi i = 0°$ or

−22.5°<$\alpha_i$<22.50: applies for (Pnumerator<0.4142 Pdenominator and Pdenominator>0 and Pnumerator>0)

or for (−Pnumerator<0.4142 Pdenominator and Pdenominator>0 and Pnumerator<0)

angle value of phase rotation element to be set: $\Phi i = 0°$

The other angle ranges for 22.5°<$\alpha_i$<67.5°, etc. can also be defined as above for this resolution.

If one designates the angle ranges in ascending order, as indicated above, with w=0, 1, 2, ... (M*A)−1, in other words w=0, 1, 2, . . . 8−1, then after determination of the angle range for $\alpha_i$, by means of switching on the corresponding phase rotation element with the angle value $\Phi i=-w*360°/(4*2)$, the signal of the $i^{th}$ antenna is rotated into the vicinity of the phase location of the signal $A_{norm}$, for phase alignment in the sense of the present invention.

In an advantageous embodiment, only those antenna signals whose current level makes a positive contribution to the signal/noise ratio of the combined signal 14, with regard to the inherent noise of the system and with regard to the signals of the other antennas are used to form the combined signal 14. The exclusion of such antenna signals can advantageously take place by way of corresponding switch setting signals 15 that are generated in the computer device 7.

Figure 13:
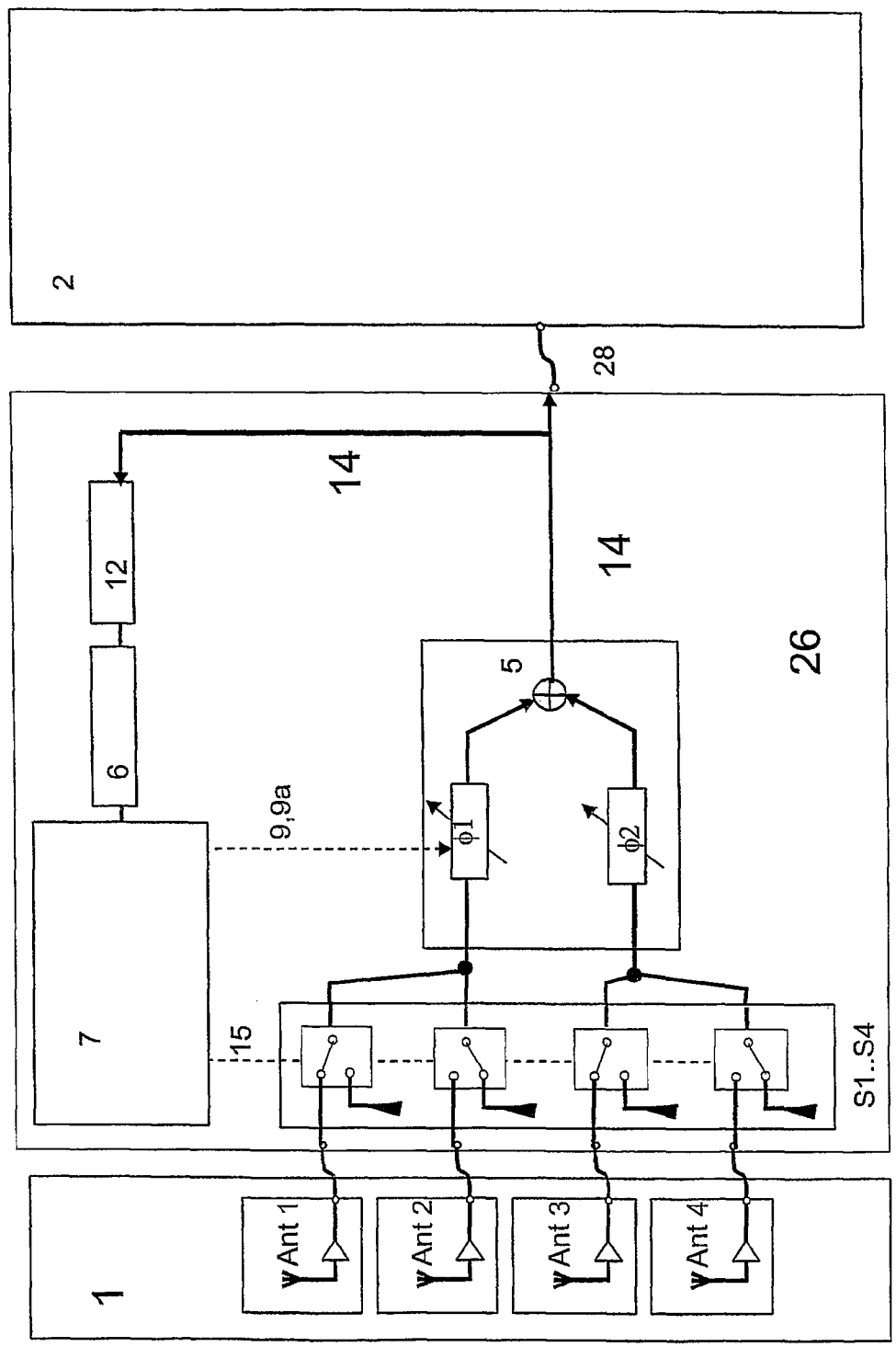
FIG. 13 is a schematic block diagram similar to that shown in FIG. 5A, wherein there are pre-selection antennas that can be combined.

Other particularly efficient embodiments of a reception system according to the invention FIG. 13 shows a reception system as in FIG. 5A, with four antennas A1 . . . A4, but with pre-selection of antennas that can be combined, with the aim of saving phase rotation elements. Of the four antenna signals shown, two antennas, in each instance, are alternatively switched through to a phase rotation element Φ1 or Φ2, respectively. In this way it is possible to form the combined signal 14 from the antenna signals having the greater reception levels, from the pairs 1-2 and 3-4, in each instance. In this case, only the sum signal of the antenna signals having the greatest reception levels is formed into a summed signal from the pairs 1-2 and 3-4, in each instance.

Figure 14:
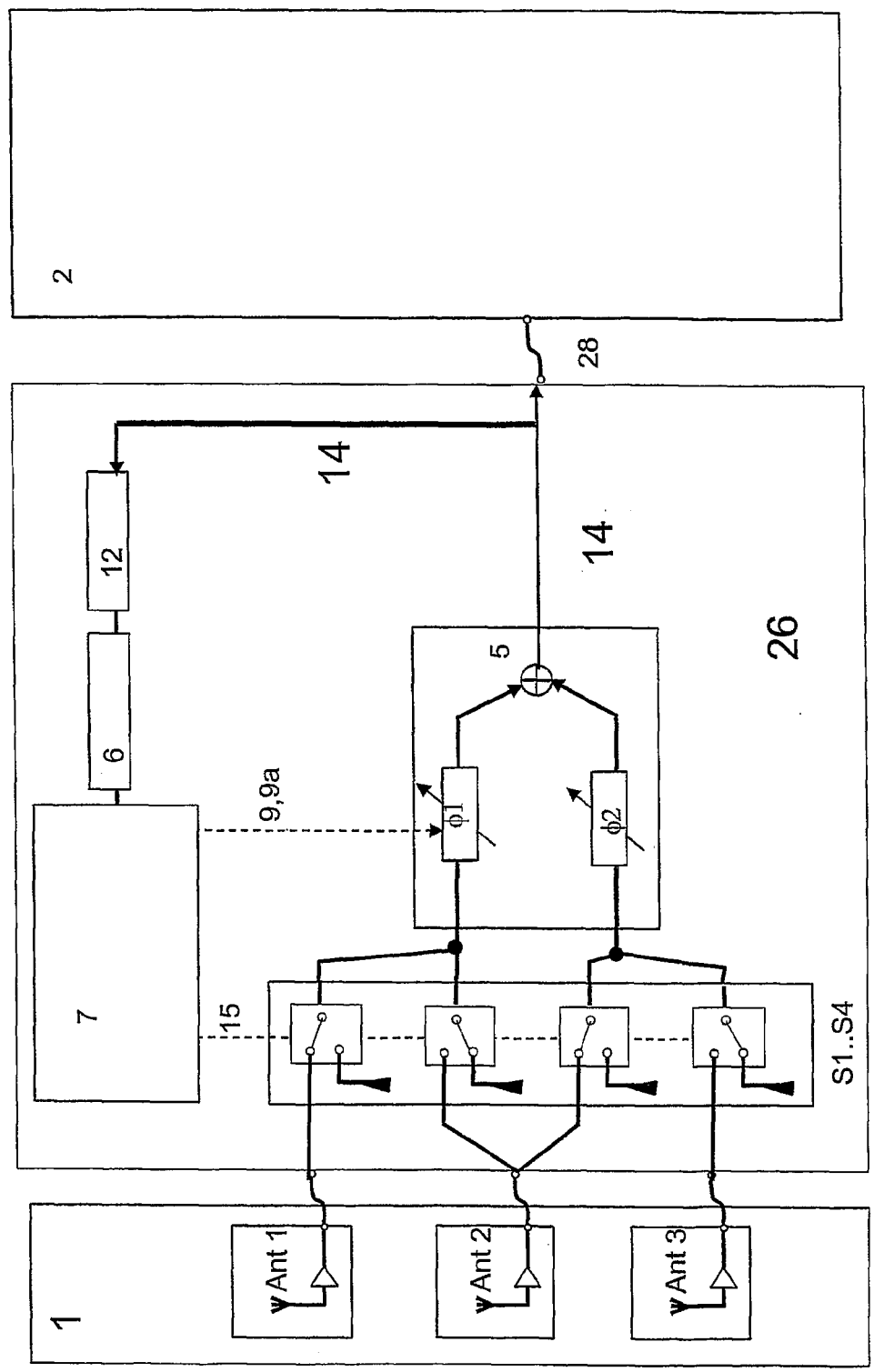
FIG. 14 is a schematic block diagram of a reception system wherein there are switches to allow for formation of all different combinations of available antenna signals.

FIG. 14 shows a reception system as in FIG. 5A, with three antennas A1 . . . A3, in which also only two phase rotation elements Φ1 and Φ2 are used. Using the four switches S1 . . . S4, all three different combination possibilities of the antenna signals can be tested, and the combined signal 14 can be formed from the two greatest antenna signals that are superimposed with the same phase. This embodiment is designed so that it is designed to allow the formation of all possible combinations of the available antenna signals and subsequent selection of the two antenna signals having the greatest reception levels, for phase alignment and summation.

Figure 15:
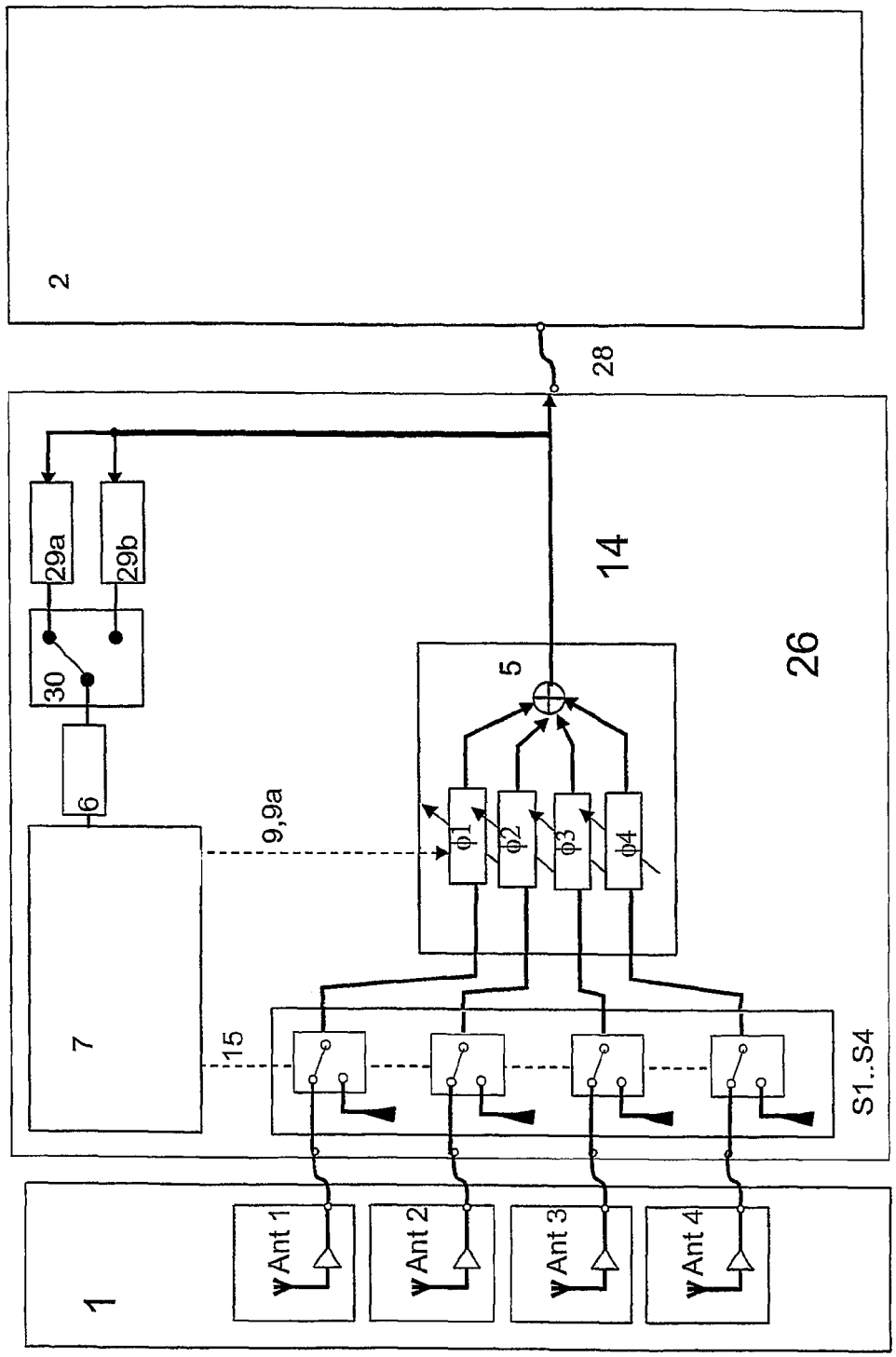
FIG. 15 is a schematic block diagram of a reception system similar to that shown in FIG. 5B further comprising a channel selection switch.
Figure 16:
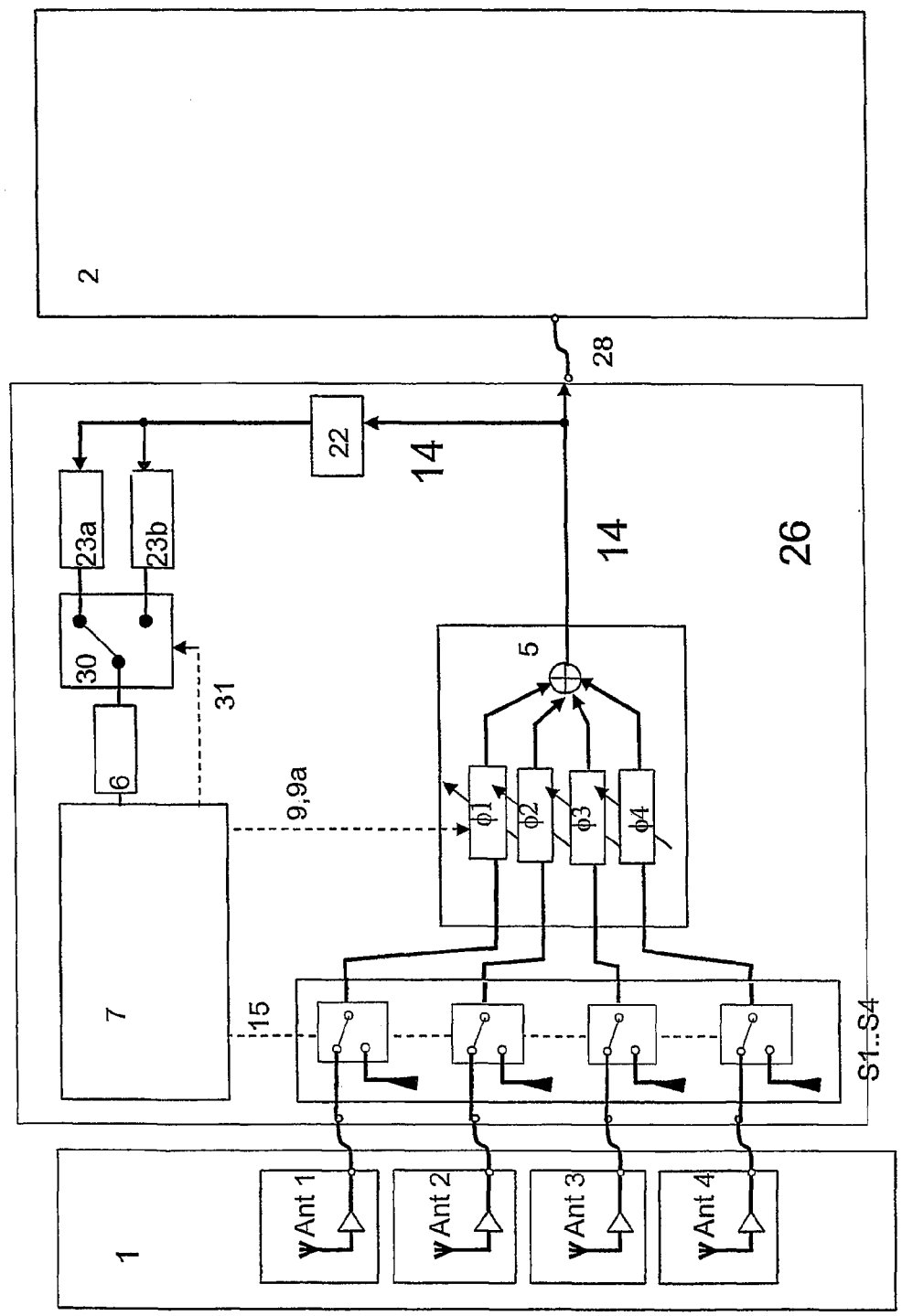
FIG. 16 is a schematic block diagram of a reception system similar to that shown in FIG. 6, wherein there is a channel selection switch.

In combined reception systems having several reception channels, as in FIG. 5B, but whose frequency location is structured in such a manner that a sharp separation in frequency is not required, the more complicated HF-IF frequency part 12a, b can be eliminated and, in the interests of efficiency, simpler HF band-pass filters 29 can be used to separate the channels. Likewise, in another advantageous embodiment of the invention, a common level detector 6 can be used for both channels, which detector is selected accordingly with a channel selection switch 30, as shown in FIG. 15 for HF signals and in FIG. 16 for signals converted to a lower frequency plane, in terms of frequency. For example, FIG. 15 discloses a reception system as in FIG. 5B, but with channel selection switch 30 to save level detectors 6. Alternatively, FIG. 16 shows the reception system as in FIG. 6, but with channel selection switch 30 to save level detectors 6. The channel selection switch 30 is controlled using channel selection signals 31 that are generated in the computer device 7.

Figure 17:
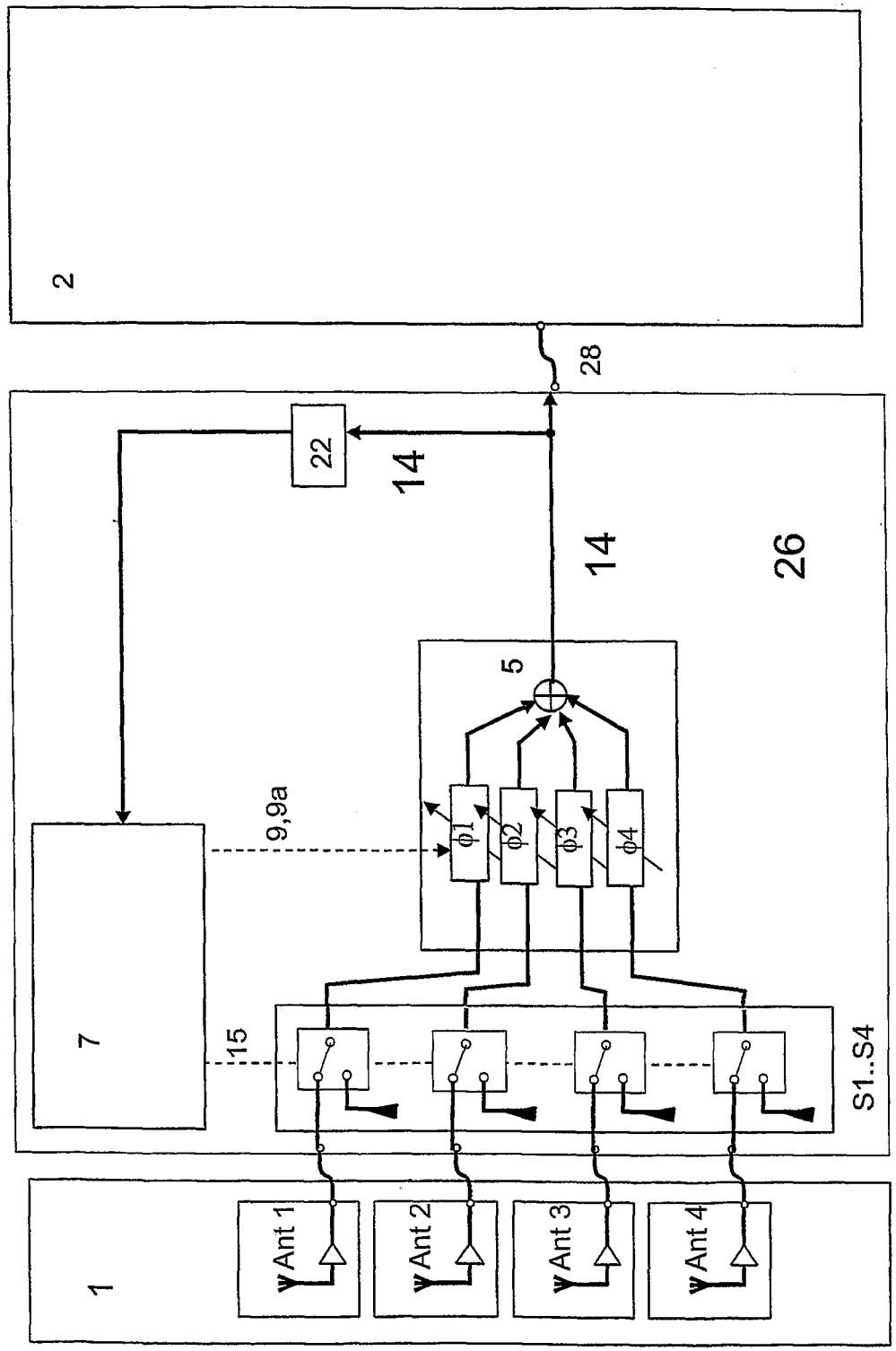
FIG. 17 is a schematic block diagram of the reception system as shown in FIG. 6 further comprising an input side AD converter.

In another particularly advantageous embodiment of a reception system according to the invention, the digital computer device 7 in FIG. 6 is provided with an input-side AD converter for digital IF-signal processing and level assessment. This system is shown in FIG. 17, as an example. For example, FIG. 17 discloses a reception system as in FIG. 6, but with a digital computer device 7 with input-side AD converter for digital IF-signal processing and level assessment.

Figure 18:
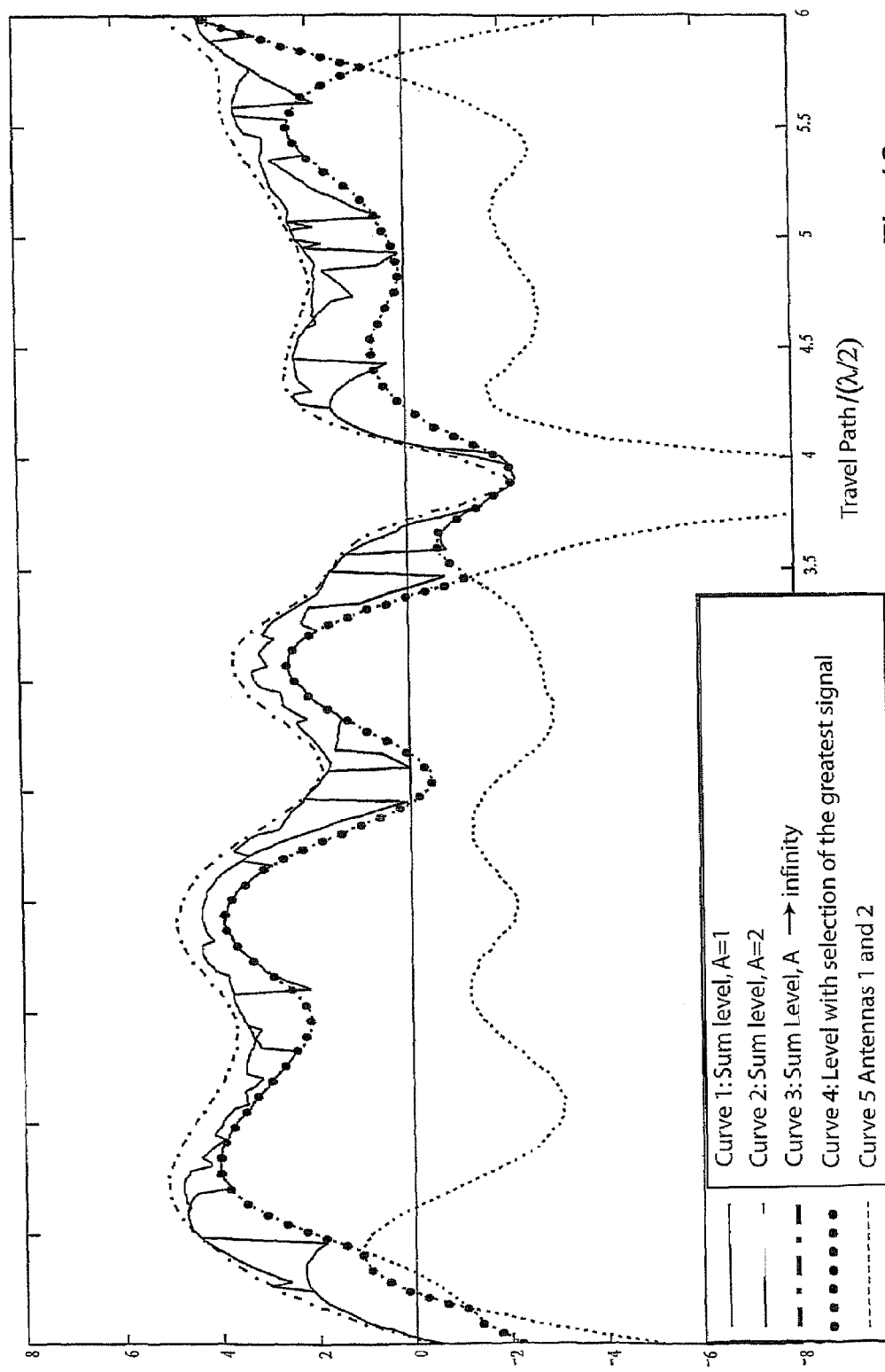
FIG. 18 is a graph representation showing a plurality of different reception curves.

FIG. 18 is a comparison of the progression wherein the following deliberations serve as proof that the use of phase rotation elements with discrete angle setting, which are simple to implement, is justified with an MPSK system. For this purpose, the progression of the amplitudes of the QPSK reception signals at the receiver input is shown over the travel distance, when using two antennas, in the advantageous Method 3, in various scenarios, for comparison. Curve 2, which applies for the reception system, when using phase rotation elements with discrete phase rotation angles of 45° (resolution A=2), does not practically differ from Curve 3 for a reception system, with ideal phase alignment of the two antenna signals (A=infinite).

If phase rotation elements having discrete phase rotation angles of 90° (resolution A=1) are used, as can be seen in Curve 1, then the amplitude progression takes place with jumps, but this does not harm the reception of the QPSK signals. In this case, too, the amplitude progression still lies higher than or at the same height as the amplitude of the best antenna, in each instance. Curve 4 shows the level progression in the case of selection of the best antenna, in each instance. This example shows a reception system with switching diversity, for comparison, whereby there is switching of the currently greater antenna signal to the receiver, in each instance, without sum formation. In the case of switching diversity without the angle correction, however, this signal, without additional technical measures, would have the significant disadvantage that with a switch in the antenna signal, the reference phase in the receiver is lost, in each instance, and the QPSK symbols in the receiver can no longer be assigned to the applicable angle ranges. It is one of the significant advantages of the present invention to be able to do without such measures. Furthermore, it can be seen that the amplitude progression of the above designs and methods generally achieves higher values as compared with switching diversity, independent of the selection of the discrete phase rotation angles.

Figure 19A:
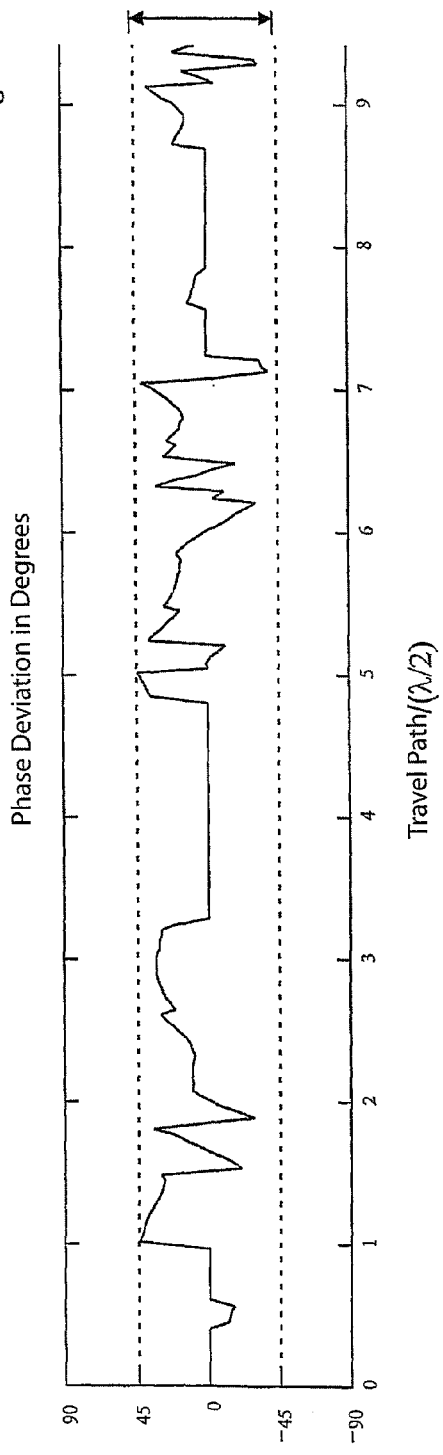
FIG. 19A is a progression of the deviation from the reference phase of a QPSK reception signal at a receiver input over a travel distance wherein there is phase rotation elements with a 90 degree phase resolution.
Figure 19B:
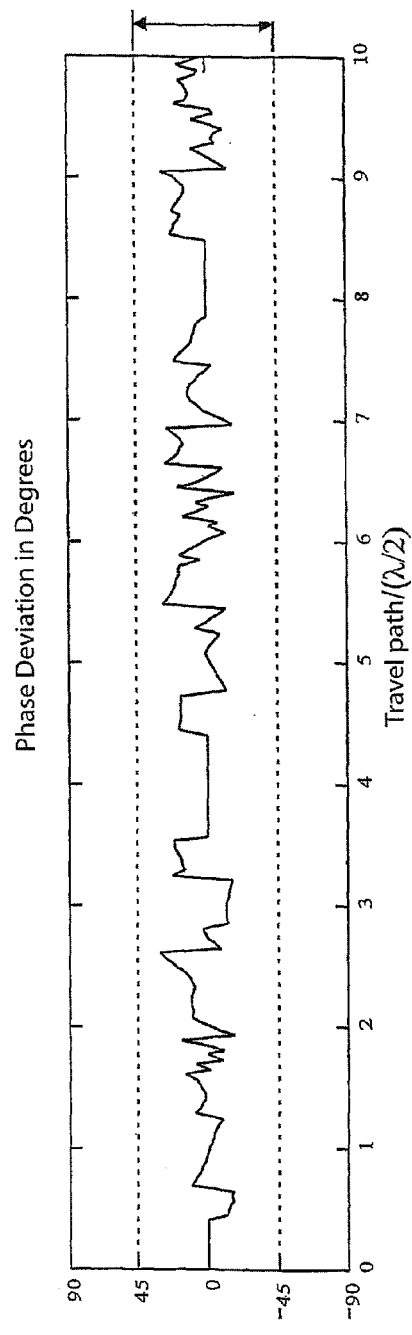
FIG. 19B is a progression of the deviation from the reference phase wherein there is a phase rotation of phase rotation elements with a 45 degree phase resolution.

Finally, in FIG. 19A, the progression of the deviation of the phase of the related combined signal 14 when using phase rotation elements having the angle resolution of 90° (A=1) is plotted over the travel distance. Over the entire travel distance, the absolute value of the deviation remains within the tolerable angle range of −45° to +45°. In the interests of greater detection reliability of the received QPSK symbols, however, a greater angle resolution of 45° (A=2) is recommended. This setting leads to smaller angle deviations, as is evident from FIG. 19B. The term "phase alignment" in the sense of the present invention is therefore not limited to continuous phase alignment of the antenna signals in the strict idealized sense. Instead, "phase alignment" in the sense of the present invention exists even if the remaining phase deviation of the antenna signals relative to one another is always sufficiently small so that these support one another when superimposed, and the remaining angle deviations in the combined signal 14 are sufficiently small so that incorrect detection is avoided in the existing MPSK system, in each instance.

Supplemental to the above explanations concerning the particularly advantageous Method 3, it will be explained, using FIGS. 20A and 20B, in what manner the phase rotation angle $\alpha_i$, which is required for setting the phase rotation elements, can be determined in terms of amount and sign. For this purpose, levels of different signals are measured at different test settings t1 . . . t4. As shown in FIG. 10b, $A_s$ describes the complex sum of the signals that have already been superimposed with the same phase.

In the two test settings t2 and t3, the levels of the signals Ai and As are determined in the level indicator 6. The two possibilities of the sign for the angle $\alpha_i$ shown in FIG. 20a result from these three level values; this angle is now known in terms of its behavior. For a differentiation of the two possible cases, the sum signal is formed from the signal $A_i$, rotated by the positive angle of 90°, and the signal $A_s$, in another test setting t4, and the level of the sum signal is measured. The true sign of the angle $\alpha_i$ can be indicated by means of calculations, from the geometrical relationships of the two parallelograms in FIG. 20b.

In another advantageous embodiment of the invention, the time intervals Tz between the level test cycle signals (10) are selected to be so short, when traveling through a reception field in which interference occurs due to multi-path propagation (Rayleigh field), that the travel distance traveled during this time interval Tz is not greater than ½₀ of the length $\lambda$ of the high-frequency carrier wave. For applications at frequencies of about 2.3 GHz, for example, this requires a time interval of Tz=230 ms between the level test cycle signals 10 at a driving speed of about 100 km/h. Over the travel distance of ½₀ $\lambda$, the phase of the antenna signal typically changes by about 20° in the case of reception in the Rayleigh field. However, this value can be exceeded if severe signal collapses occur. However, such antenna signals can be precluded at this point in time of the formation of the combined signal 14, by way of the level criterion, in accordance with the above explanations. In this way, it is assured that an antenna signal that is not specifically affected by a level collapse changes only slightly, in terms of both phase and amplitude, over the time interval of Tz. This situation can be used, in an advantageous embodiment of the invention, to check the plausibility in the determination of the angle $\alpha_i$ that is required for phase alignment.

If an overly great angle difference is found for an antenna signal, in the determination of the angle $\alpha_i$ according to one of the methods listed above, in consecutive test cycles, then the determined value of $\alpha_i$ is recognized as being wrong and can be corrected by means of immediately repeating the test process. On the other hand, in an advantageous embodiment of the invention, renewed phase alignment of the antenna signals is not performed if the level of the combined signal 14 is sufficiently great for reliable detection of the received symbols in the receiver. With this design, it is merely necessary to detect exclusively the level of the combined signal 14 in the test setting t1, at time intervals Tz. Further measurements for determining the angle $\alpha_i$ of the antenna signals as well as subsequent re-setting of the phase rotation elements $\Phi 1$, $\Phi 2$ . . . can be eliminated in these situations. Only if the value drops below the minimal level for the combined signal 14 required for reliable detection will phase alignment be brought about again, by way of the necessary test settings t1 . . . t4, in accordance with the above explanations. This is collected with the advantage of minimal loss of data, caused by test processes. This method of procedure is advantageously stored in the memory of the computer device 7, as programs, and is used to control the reception system using the level criterion for the combined signal 14, while a user is driving.

Figure 21:
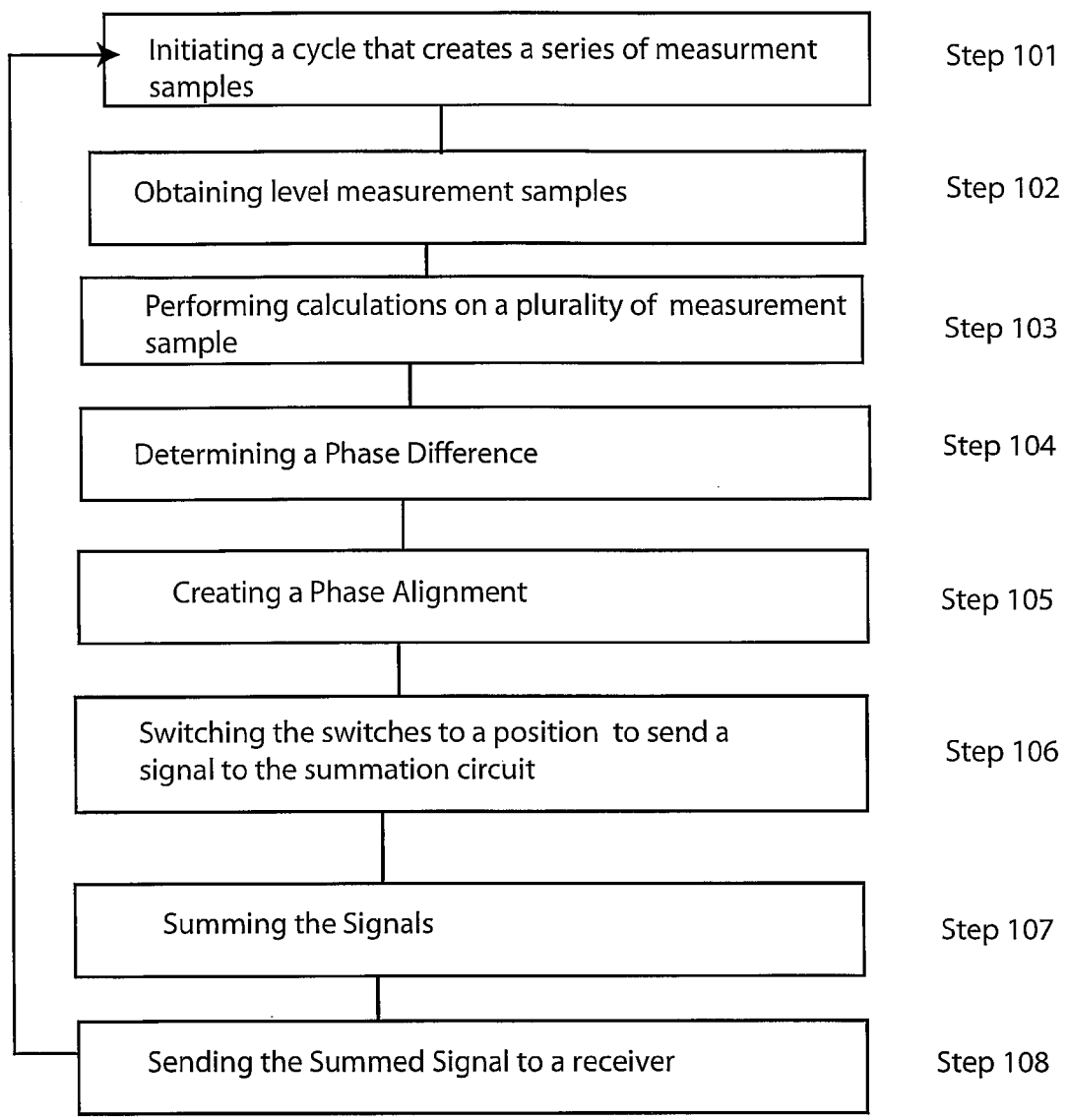
FIG. 21 is a flow chart of the functions and calculations performed by the computer device.

FIG. 21 shows a flow chart for the basic calculations or functions that can be performed by computer device 7, microprocessor 18, either separately or together to achieve a phase aligned summed signal that feeds into receiver 2.

For example, there is shown in step 101 a first step of initiating a cycle that creates a series of measurement samples. Next in step 102 one or more level measurement samples can be obtained. Once the level measurement samples are obtained, step 103 involves performing calculations on a plurality of measurement samples. These calculations can lead to the determination of a phase difference in step 104. Next, in step 105, the phase rotation elements can create a phase alignment of the different antenna signals. Once all of the antenna signals are phase aligned, in step 106 the switches can switch to a position such as a closed position to send these signals to a summation circuit in step 106. In step 107 the signals are summed. Finally, in step 108, these phase aligned summed signals can then be passed to a receiver 2. This entire process can by cycled a plurality of times wherein after that set of summed signals are sent, then the cycle starts over again. Each cycle can be for example over a time Tz.

In one embodiment, there can be a non variable phase shifting functionality in the summation circuit 5. In this case, the subsequent setting of the phase rotation elements ($\Phi 1$, $\Phi 2$, . . .)for phase adjustment of the reception signals (E1, E2 . . .)occurs in that way that the output of the summation circuit 5 is in the form of a phase aligned signal that is passed to the receiver 2. Therefore, with this embodiment, the phase rotation elements ($\Phi 1$, $\Phi 2$, . . .)and the summation circuit 5 may be combined in one unit of combined functionality. This embodiment can be shown in for example FIGS. 5A-8, however this feature is possible for all embodiments shown.

Accordingly, while a few embodiments of the present invention have been shown and described, it is to be understood that many changes and modifications may be made thereunto without departing from the spirit and scope of the invention as defined in the appended claims.

What is claimed is:

1. A reception system for motor vehicles, comprising:
a multi-antenna system having at least two antennas for producing reception signals,
at least one receiver circuit,
at least one individually adjustable phase rotation element, with at least one phase rotation element for receiving reception signals from a corresponding antenna;
a plurality of individually adjustable switching elements for switching through or interrupting a signal flow, wherein each of said switching elements respectively, is present in a reception path of each antenna, and wherein said reception signals are guided by way of said at least one individually adjustable phase rotation element;
a linear summation circuit wherein said plurality of adjustable switching elements pass said reception signals to said linear summation circuit to form a summarized signal;
a level indicator for indicating the level of the summarized signal in the form of a level signal and in communication with said at least one receiver circuit; and
a computer device having a memory and having an input coupled to an output of said level indicator, said computer device for receiving said level signal, and having an algorithm stored on said memory of said computer device wherein said algorithm performs calculations for determining a set of phase differences of the reception signals that are present at an input of said summation circuit (5) at a given setting of said phase rotation elements from their level conditions, so that a determination of said phase differences, by means of calculations, is given on a basis of level measurement samples of said measurement level signal that are performed one after the other, in terms of time, and obtained by way of switch setting signals and phase setting signals brought about by said computer device in the case of differently defined settings of said switching elements or of said phase rotation elements, respectively, and wherein said phase setting signals are generated on the basis of the phase differences determined by calculations, for the subsequent setting of the phase rotation elements for phase alignment of the reception signals that are present at the input of the summation circuit when said plurality of adjustable switching elements are switched through and wherein said output of said summation circuit is in the form of a phase aligned summed signal that is passed to said receiver circuit.

2. The reception system according to claim 1, further comprising:

a level test cycle generator that generates a level test cycle signal that is passed to said computer device for cyclical determination of said level measurement samples determined at different settings of said switching elements or of said at least one phase rotation element, respectively, and wherein said level measurement samples have a short level measurement duration which is required for level indication, in each instance, wherein during a duration of each measurement sample, there is a determination of a setting of said plurality of switching elements or of said at least one phase rotation element, respectively, wherein after an expiration of said level test cycle signal, there is an initiation of said plurality of phase setting signals for setting said at least one phase rotation element, for phase alignment of said reception signals located at an input of said linear summation circuit.

3. The reception system according to claim 1, wherein said computer device includes a program having a computer code which performs the following functions:

updating a phase alignment of said reception signals located at an input of said linear summation circuit by means of a repeated occurrence of level test cycle signals at level test cycle time intervals, wherein said time intervals are adapted to a time change in the reception conditions, so that said phase changes in said reception signals caused by a change over time of the radio transmission channel during said test cycle time interval are small enough to be ignored, with regard to reception interference.

4. The reception system according to claim 3, wherein said time intervals between said level test cycle signals are selected to be sufficiently short such that a driving distance traveled during this time interval is not more than ⅕ of a length of a high-frequency carrier wave.

5. The reception system according to claim 4 for digitally modulated high-frequency signals according to the MPSK method, wherein said program code includes an additional set of functions comprising:

updating of a phase alignment which is given independent of a symbol cycle and frame signals of said MPSK modulation.

6. A reception system according to claim 1, wherein said computer device includes program that performs the following functions:

performing calculations on said level test cycle signal for determining phase differences of said reception signals;

obtaining three level measurement samples comprising:

obtaining two level measurement samples with alternative closing of two switching elements of a first and a second antenna;

obtaining a third measurement sample with a simultaneous closing of said switching elements of said first and said second antenna with all other switching elements being switched open;

determining phase differences between related reception signals located at an input of said summation circuit;

creating a phase alignment of said two reception signals of said first and said second antenna which is created by means of at least one phase rotation element;

wherein for successive phase adaptation of said reception signal of at least one additional antenna a first and a second switching element taken from said plurality of switching elements are switched in a same direction while maintaining a setting of said phase rotation elements, wherein, said first and said second antenna signals are combined so that they enter into a place of said first antenna, with regard to a sequence of phase alignment;

wherein said additional switching element of said additional antenna is set in accordance with said second antenna to determine corresponding level measurement samples;

setting said additional phase rotation element of said additional antenna on a basis of a determined phase difference wherein said phase rotation element of each antenna is continuously set until phase alignment is produced for all reception signals.

7. The reception system according to claim 1, further comprising a plurality of HF-IF parts wherein for several different frequency bands, said plurality of HF-IF parts are each tuned to a corresponding frequency band, so that each of said plurality of switching elements is followed by at least one of said at least one phase rotation element respectively, corresponding to each of said frequency bands, whereby a set of reception signals are respectively assigned to said frequency bands in each instance, and are combined into a combined signal in an assigned linear summation circuit, in each instance, and passed to a corresponding one of said plurality of HF-IF parts, and wherein said phase alignment of the reception signals, are respectively superimposed in said summation circuits and are updated for all the frequency bands at level test cycle time intervals.

8. The reception system according to claim 1, wherein said receiver circuit, has an input for reception of a radio channel, wherein the system further comprises a separate diversity unit, and a receiver line, wherein said separate diversity unit is connected with said plurality of antennas on an input side, and with said receiver circuit on the output side, by way of said receiver line, and wherein said level indicator, said computer device, said plurality of individually adjustable switching elements, said at least one individually adjustable phase rotation element, said summation circuit, and an HF-IF part are present in said diversity unit, to which a combined signal is passed on the input side, and the output signal of which is passed on to said level indicator, and wherein said combined signal is passed on to said at least one receiver circuit by way of said receiver line.

9. The reception system as in claim 7, wherein said at least one receiver circuit has at least one input for receiving at least one signal from at least two channels that differ in frequency, wherein the device further comprises:

a diversity unit wherein said plurality of HE-IF parts are disposed in said diversity unit, wherein said diversity unit has an input for receiving signals from said at least two antennas and an output coupled to said receiver line which is coupled to said input side of said at least one receiver circuit;

wherein said diversity unit further includes said signal level indicator wherein said signal level indicator is coupled to said plurality of HF-IF parts and wherein each of said plurality of HF-IF parts have an input for receiving at least part of said combined signal.

10. The reception system as in claim 1, further comprising:
a diversity unit wherein said level indicator, said computer device, said plurality of individually adjustable switching elements, said at least one individually adjustable phase rotation element, and said summation circuit, are disposed in said diversity unit and wherein said diversity unit further comprises a multi-channel frequency converter which is used for joint frequency conversion of different high frequency satellite signals into frequencies that are different from one another into a lower frequency plane, wherein the system further comprises:
a plurality of band pass filters for receiving said frequency plane, wherein said band pass filters are for separating said signals that are different in frequency wherein said separate level indicator determines a level of said signals that are determined separately, wherein said signals are passed to said computer device.

11. The reception system as in claim 1, further comprising:
a diversity unit wherein said level indicator, said computer device, said plurality of individually adjustable switching elements, said at least one individually adjustable phase rotation element, and said summation circuit, are disposed in said diversity unit and wherein said diversity unit further comprises:
a controllable mono channel frequency converter that is used for alternate setting to the frequency of the high-frequency satellite reception signal so that a signal in a lower frequency plane occurs at its output,
a band pass filter;
wherein said signal from said frequency converter is passed to said signal level indicator by way of said band pass filter, wherein said computer device generates channel selection signals which determine both the cycle in accordance with a level test cycle time interval and a selection of said signal to be tested for two satellite channels.

12. The reception system as in claim 1, wherein said receiver comprises:
a plurality of HF-IF parts which produce output signals located in a low frequency plane;
a cycled level test change over switch wherein said output signals of said plurality of HF-IF parts are passed to said change over switch;
a signal level indicator for receiving signals from said change over switch;
a microprocessor for receiving level signals from said signal level indicator, wherein said signal level indicator is controlled by said microprocessor;
a plurality of frequency setting switches;
and wherein the reception system comprises a diversity unit which comprises
said at least one individually adjustable phase rotation element;
said plurality of individually adjustable switching elements;
at least one frequency setting switch;
a logic circuit for receiving signals from said frequency setting switches in said diversity unit which receives digital signals from said frequency setting switches in said receiver; wherein said logic circuit generates said phase setting signals for setting said at least one individually adjustable phase rotation element and said switch setting signals.

13. The reception system as in claim 1, wherein said computer device having said algorithm performs calculations to determine:
a phase difference between a phase of a combined signal that is present at an output of said linear summation circuit before occurrence of said level test cycle signal,
a set of phases of said reception signals of said plurality of antennas, wherein said phases of said reception signals are rotated into a phase position of said combined signal that is present at the output of said linear summation circuit before occurrence of the level test cycle signal in each instance on the basis of said phase differences by means of setting said phase rotation elements.

14. The reception system as in claim 1, wherein said computer device has a set of instructions to perform a series of calculations comprising the following steps:
avoiding ambiguities with regard to phase differences to be determined, within a framework of a level test cycle, by changing a phase of at least one of said reception signals by a predetermined phase change value, wherein said phase differences that actually apply are determined from a set of level measurement samples.

15. The reception system as in claim 1, wherein said at least one individually adjustable phase rotation element has a phase rotation angle that has a fixed set, discrete value.

16. The reception system as in claim 15, wherein said at least one individually adjustable phase rotation element comprises a plurality of phase rotation elements which each have phase rotation angles that have a fixed set of discrete values so that all phase angles of an angle space of 360 can be set in a discrete manner with a predetermined step width of 360/(M*A), and wherein M is a modulation number and said angle resolution A is selected to be sufficiently large to avoid detection errors of said symbols.

17. The reception system as in claim 16, wherein each of said plurality of phase rotation elements selects an angle resolution that is not smaller than A=1.

18. The reception system as in claim 16, wherein said reception system is formed as a MPSK system wherein said plurality of phase rotation elements sets an angle based upon 360/(M*A), with a resolution A of at least A=2.

19. The reception system as in claim 15, wherein said at least two antennas comprise at least four antennas, and wherein the system further comprises at least two node points, wherein said plurality of individually adjustable switching element comprise a first switching element that alternately switches between at least two of said antenna signals from at least two antennas to a first node point as a pair for performing a level test, and an additional switching element that switches between at least two additional antenna signals from at least two other antennas to a second node point, wherein an output of said first switching element and said additional switching element are each passed to at least one of said plurality of individually adjustable phase rotation elements, wherein each output signal of said at least two node points is passed to said linear summation circuit, such that each output signal of said at least two node points are superimposed with a same phase in a combined signal, whereby with each antenna pair, a signal with the greatest level is switched through.

20. The reception system as in claim 1, wherein said at least two antennas comprise at least three antennas including a first antenna, a second antenna and a third antenna; wherein said plurality of individually adjustable switching elements comprise at least two switching elements including a first switching element, and a second switching element; and wherein said at least one individually adjustable phase rotation element comprises at least two phase rotation elements including at least a first phase rotation element and at least a second phase rotation element, and wherein the system further comprises at least two nodes including at least a first node and at least a second node wherein, at least two of said at least three antennas are switched to said at least one first node of said at least two nodes to form a first antenna signal;

a third antenna is switched to said at least one second node to form a second antenna signal;

wherein an output of said at least one first node is in the form of said first antenna signal which is communication with said at least one first phase rotation element;

an output of said at least one second node which is in the form of said second antenna signal is in communication with said at least one second phase rotation element, wherein said at least one first phase rotation element and said at least one second phase rotation element are coupled together such that said first antenna signal and said second antenna signal form a combined signal, wherein said combined signal is formed from a same phase superimposition of said first antenna signal and said second antenna signal having a greatest level.

21. The reception system as in claim 9, wherein there are at least two channels, wherein the system further comprises a plurality of HF filters, with at least one HF filter disposed along each channel.

22. The reception system as in claim 9, further comprising a channel selection switch, wherein said HF filters have their output passed to said channel selection switch at whose output the signal of the frequency channel in question is passed to the signal level indicator, in each instance, and the channel selection switch is appropriately controlled by the channel selection signals generated in said computer device.

23. The reception system as in claim 22, wherein said computer device further comprises an A-D converter for digital signal processing and level assessment disposed on an input side of said computer device.

24. The reception system as in claim 22, wherein said computer device has a program that performs the following functions:

determining different levels of signals in terms of amount and sign at four different test settings;

determining a level of an antenna signal, in a test setting;

determining a level of an antenna signal in a test setting;

determining a level of a sum signal of signals and in a test setting;

determining an amount of an angle $\alpha i$ from said three level values, for the differentiation of two possible signs of angle;

forming a sum signal in a further test setting from a signal rotated by a positive angle 90;

measuring a level of said sum signal;

determining a true sign of an angle via calculations from a geometric relationship.

25. The reception system as in claim 1, wherein said computer device has a program that performs the following functions:

determining a difference of a phase angle $\alpha i$ of an ith antenna signal, wherein said difference is determined between values measured in consecutive time intervals Tz, wherein if an angle difference that is required for plausability is exceeded, the plausible value is determined by means of repeated determinations of a phase angle;

selecting time intervals Tz in a manner so that a travel path traveled during said time interval Tz is not greater than $\frac{1}{20}$ of a length $\lambda$ of a high-frequency carrier wave.

26. The reception system as in claim 25, wherein said program performs the following additional functions:

measuring a level of a combined signal to determine a need for a phase alignment of antenna signals, wherein said combined signal is measured in consecutive time intervals Tz;

determining whether a minimal level of said combined signal has been reached;

performing a cycle for phase alignment of said minimal level of said combined signal is not reached;

wherein if a minimal level of said combined signal has been reached, a current setting of said phase rotation elements remains unchanged, wherein these functions are performed to determine the phase rotation angle $\alpha i$ between said sum signal of said antenna signals that have already been superimposed in a same phase before a beginning of a test cycle, wherein an antenna signal is supposed to be phase aligned with said sum signal.

27. The reception system as in claim 1, wherein said at least one individually adjustable phase rotation element comprises a plurality of individually adjustable phase rotation elements wherein each individually adjustable switch element is coupled to at least one individually adjustable phase rotation element such that for N number of switch elements there are N-1 number of phase rotation elements disposed in a diversity unit.

* * * * *

UNITED STATES PATENT AND TRADEMARK OFFICE
CERTIFICATE OF CORRECTION

PATENT NO. : 7,702,051 B2
APPLICATION NO. : 11/611483
DATED : April 20, 2010
INVENTOR(S) : Lindenmeier et al.

It is certified that error appears in the above-identified patent and that said Letters Patent is hereby corrected as shown below:

On the title page, Item [73], please insert the Assignee information as follows:
--Delphi Delco Electronics Europe GmbH, Bad Salzdetfurth, DE--.

Signed and Sealed this

Fifteenth Day of June, 2010

David J. Kappos
*Director of the United States Patent and Trademark Office*